(12) United States Patent
Katayama et al.

(10) Patent No.: US 7,287,073 B2
(45) Date of Patent: Oct. 23, 2007

(54) REMOTE SITE MANAGING SYSTEM FOR CENTRALLY MANAGING COMPUTERS AND PERIPHERAL DEVICES

(75) Inventors: Kojiro Katayama, Tokyo (JP); Makoto Kawashima, Kanagawa (JP); Junichi Hirose, Sydney (AU); Kazushi Ohmori, Chiba (JP); Hiroyuki Hara, Kanagawa (JP); Shinichi Nakamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 521 days.

(21) Appl. No.: 09/987,487

(22) Filed: Nov. 15, 2001

(65) Prior Publication Data
US 2002/0091821 A1    Jul. 11, 2002

(30) Foreign Application Priority Data
Nov. 17, 2000   (JP)   ............................. 2000-351262

(51) Int. Cl.
G06F 15/173    (2006.01)
(52) U.S. Cl. ...................... 709/224; 709/203; 709/217; 709/223; 714/1; 714/2; 714/25; 714/44
(58) Field of Classification Search ........ 709/223–224, 709/203, 217; 714/1, 2, 25, 44
See application file for complete search history.

(56) References Cited

U.S. PATENT DOCUMENTS

| | | | | |
|---|---|---|---|---|
| 5,388,252 A | | 2/1995 | Dreste et al. ............... 395/575 |
| 5,504,863 A | * | 4/1996 | Yoshida ........................ 714/47 |
| 5,678,002 A | | 10/1997 | Fawcett et al. ......... 395/183.01 |
| 5,961,594 A | * | 10/1999 | Bouvier et al. ............. 709/223 |
| 6,003,065 A | * | 12/1999 | Yan et al. .................... 709/201 |
| 6,085,244 A | * | 7/2000 | Wookey ....................... 709/224 |
| 6,173,422 B1 | * | 1/2001 | Kimura et al. ................ 714/57 |
| 6,260,160 B1 | * | 7/2001 | Beyda et al. .................. 714/27 |
| 6,298,308 B1 | * | 10/2001 | Reid et al. ..................... 702/56 |
| 6,298,377 B1 | * | 10/2001 | Hartikainen et al. ........ 709/223 |
| 6,308,205 B1 | * | 10/2001 | Carcerano et al. .......... 709/221 |
| 6,317,701 B1 | * | 11/2001 | Pyotsia et al. .............. 702/188 |
| 6,389,464 B1 | * | 5/2002 | Krishnamurthy et al. ..... 702/56 |
| 6,415,392 B1 | * | 7/2002 | Suzuki et al. ................. 714/27 |
| 6,505,145 B1 | * | 1/2003 | Bjornson .................... 702/185 |
| 6,697,962 B1 | * | 2/2004 | McCrory et al. ............. 714/27 |
| 6,707,567 B1 | * | 3/2004 | Suzuki ...................... 358/1.15 |
| 6,878,112 B2 | * | 4/2005 | Linberg et al. ............. 600/300 |
| 6,915,342 B1 | * | 7/2005 | Motoyama .................. 709/224 |
| 6,947,675 B2 | * | 9/2005 | Koyama et al. ............... 399/8 |
| 7,093,169 B2 | * | 8/2006 | Merriam ...................... 714/47 |
| 2005/0060396 A1 | * | 3/2005 | Hirooka ...................... 709/223 |
| 2005/0198234 A1 | * | 9/2005 | Leib et al. .................. 709/221 |

FOREIGN PATENT DOCUMENTS

| | | |
|---|---|---|
| EP | 0 474 058 A2 | 3/1992 |
| EP | 0 751 651 A2 | 1/1997 |
| EP | 0 921 465 A2 | 6/1999 |
| EP | 0 930 747 A1 | 7/1999 |
| JP | 06-164715 | 6/1994 |
| JP | 08-102796 | 4/1996 |
| JP | 11-243424 | 9/1999 |
| JP | 2000-112847 | 4/2000 |
| WO | 97/15009 | 4/1997 |
| WO | 98/50853 | 11/1998 |
| WO | 00/41059 | 7/2000 |

* cited by examiner

Primary Examiner—Saleh Najjar
Assistant Examiner—Shawki S Ismail
(74) Attorney, Agent, or Firm—Fitzpatrick, Cella, Harper & Scinto

(57) ABSTRACT

A remote site managing system for centrally managing computers and peripheral devices of a customer, is provided. In the event that there is trouble with equipment in the office to be serviced, and a customer in the office notifies the maintenance service company of the trouble by telephone (i.e., a center call), the remote site managing system deals with the trouble in an appropriate manner, and dispatches maintenance (either dispatching service personnel or commissioning the maintenance to another service company) in a smooth manner.

36 Claims, 30 Drawing Sheets

FIG. 8

| FIELD | LENGTH (BYTES) | APPLICATION |
|---|---|---|
| TAG | | |
| FLAG | 1 | INDICATES VARIOUS TYPES OF INFORMATION.<br>THE MEANING OF THE BITS ARE AS FOLLOWS :<br>xxx..... : INDICATES COMMUNICATION MEANS<br>    B'100' = TCP / IP<br>    B'010' = DIAL-UP<br>    B'001' = E-MAIL<br>... . ...x : INDICATES WHETHER DATA IS CONTINUOUS<br>    B'0' = SIMPLE DATA OR FINAL DATA<br>    B'1' = CONTINUING DATA<br>ALL OTHER BITS ARE RESERVED FOR FUTURE USE |
| DATA TYPE | 1 | REPRESENTS THE TYPE OF DATA<br>    X'01' : VERIFICATION REQUEST DATA<br>    X'02' : PARAMETER SETTINGS REQUEST DATA<br>    X'04' : DEVICE INFORMATION OBTAINING REQUEST DATA<br>    X'08' : EVENT INFORMATION NOTIFICATION DATA<br>    X'10' : RESPONSE DATA<br>    X'80' : CUTOFF REQUEST DATA |
| JOB ID | 1 | DISTINGUISHES SEQUENCES<br>JOB IDS MUST BE THE SAME DURING A SESSION<br>    X'00' : SET PARAMETERS<br>    X'01' : OBTAIN DEVICE INFORMATION<br>    X'02' : NOTIFY EVENT INFORMATION |
| RETURN VALUES | 1 | INDICATES RETURN VALUES IN THE EVENT THAT THE DATA TYPE IS RESPONSE DATA (X' 10'). INDICATES CUT-OFF REASON IN THE EVENT THAT THE DATA TYPE IS CUT-OFF REQUEST (X' 80'). X' 00' IS SET FOR CASES WHERE THE DATA TYPE IS OTHER THAN RESPONSE DATA (X' 10') OR CUT-OFF REQUEST (X' 80'). |
| DATA LENGTH | 4 | INDICATES THE DATA LENGTH IN BYTES (NETWORK BYTE ORDER) |
| DATA | VARIABLE | DATA |

FIG. 26

| CALL CONTENTS (PHENOMENA) | MONITORING RESULTS | CAUSE / REMEDY | CUSTOMER SYSTEM CONFIGURATION |
|---|---|---|---|
| ATTEMPTED TO PRINT FROM PC 1 TO PRINTER 1 BUT FAILED, THOUGH THIS HAD WORKED EARLIER. | [PC MONITORING CLIENT]<br>• PC 1 IS NORMAL<br>• AVAILABLE CAPACITY ON PRINT SERVER HARD DISK: 200 KBYTES<br><br>[DEVICE MONITORING SERVER]<br>• PRINTER 1 IS NORMAL | [CAUSE]<br>PRINTER SERVER HARD DISK IS FULL, AND SPOOLED DATA IS NOT BEING STORED PROPERLY<br><br>[REMEDY]<br>ORGANIZE THE CONTENTS OF THE PRINT SERVER, AND SECURE AVAILABLE CAPACITY ON THE HARD DISK | 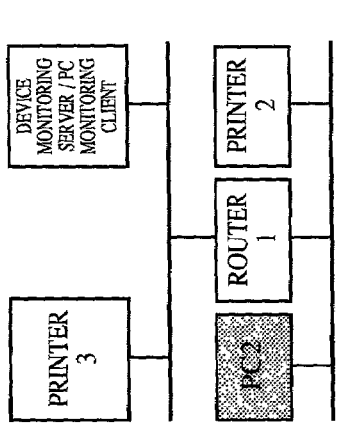 |
| SETTING UP A NEW PC 2 AND SETTING PRINTERS. CAN SEE PRINTER 2, BUT CANNOT SEE PRINTER 3. | [PC MONITORING CLIENT]<br>• ROUTER 1 IS NORMAL<br>• NO RESPONSE FROM PC 2<br><br>[DEVICE MONITORING SERVER]<br>• PRINTER 2 IS NORMAL<br>• PRINTER 3 IS NORMAL | [CAUSE]<br>THE NEW PC CANNOT CROSS SEGMENTS, SO DEFAULT GATEWAY IS NOT SET CORRECTLY<br><br>[REMEDY]<br>SET IP ADDRESS FOR ROUTER 1 TO DEFAULT GATEWAY | 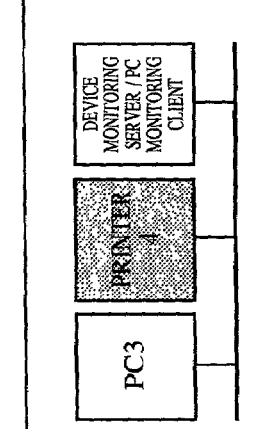 |
| ATTEMPTED TO PRINT FROM PC 3 TO PRINTER 4 BUT FAILED, THOUGH THIS HAD WORKED UNTIL YESTERDAY | [PC MONITORING CLIENT]<br>• PC 3 IS NORMAL<br><br>[DEVICE MONITORING SERVER]<br>• BAD SORTER CONNECTION ALARM AT PRINTER 4 | [CAUSE]<br>SORTER IS NOT CONNECTED PROPERLY<br><br>[REMEDY]<br>CONNECT THE SORTER PROPERLY | 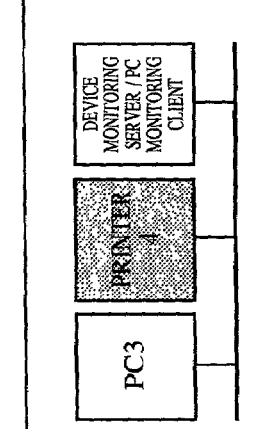 |

FIG. 27A

DISPATCH SYSTEM

USER : K CO., LTD
PRODUCT : DEVELOPMENT DEPARTMENT
PHONE : 03-3765-XXXX

CAN YOU HEAD TO THE SITE ?
1. YES
2. NO

FIG. 27B

DISPATCH SYSTEM

HOW SOON CAN YOU GET TO
THE USER SITE ?

20 MINUTES
1. YES
2. NO

FIG. 28

E-MAINTENANCE RECOVERY WORK COMMISSION SHEET

USER INFORMATION

| | |
|---|---|
| NAME | K CO., LTD. |
| DEPARTMENT | PRODUCT DEVELOPMENT |
| CONTACT (PHONE) | 03-3765-XXXX |
| CONTACT (FAX) | 03-3765-YYYY |
| CONTACT (E-MAIL) | rds@ZZZZ |

MODEL INFORMATION

| | |
|---|---|
| MODEL NO. / SERIAL NO. | ABC12345 |
| MODEL | IR5000 |
| ENVIRONMENT | |
| INSTALLATION LOCATION | BACK, 1ST FLOOR |

TIME OF TROUBLE

2001 / XX / YY
aa : bb

CONTENTS OF CALL

CONTENTS OF REMOTE TROUBLE ISOLATION

WORK COMMISSION ITEMS

○ TROUBLE ISOLATION
● RECOVERY WORK

DEADLINE FOR RESPONSE      PLEASE RESPOND TO TROUBLE BY YYYY / MM / DD / HH

YYYY / MM / DD
GENERAL MANAGER, APEX MAINTENANCE COMPANY

FIG. 29

| TIME OF TROUBLE | TIME OF RECOVERY | MODEL / SERIAL NO. | SYMPTOMS | CAUSE | REMEDY | WORK CONDUCTED BY : |
|---|---|---|---|---|---|---|
| 2001.3.3 15:35 | 2001.3.3 14:52 | ABC12345 | NO PRINTOUT ...... | PART A IS BROKEN | REPLACED PART A | ○ ○ |
|  |  |  |  |  |  |  |
|  |  |  |  |  |  |  |
|  |  |  |  |  |  |  |
|  |  |  |  |  |  |  |
|  |  |  |  |  |  |  |

DIAGNOSIS RESULTS

NO PROBLEM AT ALL. WORKING SMOOTHLY.     AAA00112, BBB77777, ........

PROBLEM(S) FOUND, BUT FIXED, SO THERE IS NO PROBLEM NOW.     ABC12345

INCIDENCE OF MALFUNCTIONING IS INCREASING. SHOULD BE MONITORED FOR AWHILE.     ABC98765

YYYY / MM / DD
APEX MAINTENANCE COMPANY EM CENTER

FIG. 30

| TIME OF TROUBLE | MODEL / SERIAL NO. | CAUSE | REMEDY |
|---|---|---|---|
| 2001.3.3 15:35 | ABC12345 | PART A IS BROKEN | REPLACED PART A |
| | | | |
| | | | |
| | | | |
| | | | |
| | | | |

YYYY / MM / DD
APEX MAINTENANCE COMPANY EM CENTER

REMOTE SITE MANAGING SYSTEM FOR CENTRALLY MANAGING COMPUTERS AND PERIPHERAL DEVICES

BACKGROUND OF THE INVENTION

1. Field of the Invention

The present invention relates to a remote site managing system which centrally and remotely monitors the state of PC/server equipment such as general-purpose personal computers (PCs) and server computers and the like that have been connected via a computer network for example, and peripheral equipment (devices) with dedicated functions, particularly those with specialized input/output functions, such as printers, photocopiers, scanners, and the like.

2. Description of the Related Art

Conventionally, there have been monitoring/managing systems for collecting operating information, error information, log information, etc., regarding equipment in offices, within the office. There have also been systems which collect such information collected in the office and monitored/managed at a center server externally set up or and connected via a network.

However, such monitoring/managing systems have been either systems which monitor and manage only PC/server systems, i.e., general-purpose computers, or systems which monitor and manage only device systems such as printers and photocopiers.

The reason that general-use computers and devices have been thus managed separately is that the procedures for managing general-purpose computers and devices are completely different. That is, with regard to managing general-use computers, it is necessary to make a program which carries out desired functions according to computer environments such as operating systems or the like and execute the program on the computers to be managed, but with regard to managing peripheral devices, it has been almost impossible with peripheral device systems to add on or exchange functions.

In addition, in the event of managing peripheral devices, there have been no standard data formats by which the monitor/managing system can communicate with the peripheral devices, nor standard procedures (protocols) for exchanging. Therefore, management procedures corresponding to each individual peripheral device must be developed, with each peripheral device being connected to the managing site and managed independently.

Thus, the managing system for devices has been incompatible with that for PCs and server computers, and accordingly these have existed as entirely separate systems.

On the other hand, as peripheral devices and PC/server computer systems have come to be used extensively in office environments, there has been greater expectation for maintenance services comprehensively monitoring and managing both the peripheral devices and computer systems.

However, with conventional methods, a maintenance service company (administration site) must provide a customer office with two monitor/managing systems, one for devices and another for PC/server computers, collect the information for both systems through separate lines, and monitor and manage the systems independently. Accordingly, the maintenance service companies have had the problems of complexity in management and high costs in operating and maintaining the systems.

SUMMARY OF THE INVENTION

The present invention has been made in light of the above problems, and accordingly it is an object thereof to provide a remote site control system, whereby the control site is able to centrally manage both the PC/server systems and the peripheral equipment in an office.

Particularly, it is an object of the present invention to provide a remote site control system which competently responds to error occurrences and arranges for maintenance (e.g., arrangements for service personnel and commissioning services to other service companies) in a smooth manner, in the event that equipment where the maintenance service company guarantees service has trouble, and the maintenance service company receives a notice of the maintenance trouble from a customer in the office by phone (i.e., a center call).

To this end, the present invention is configured with a connection to a first local managing apparatus which is connected to equipment of a first type via a local network and manages the equipment of the first type and a second local managing apparatus which is connected to equipment of a second type via a local network and manages the equipment of the second type, wherein judgment is made as to whether any trouble which has occurred is trouble in the equipment of the first type or the equipment of the second type, and one or the other of the first local managing apparatus and the second local managing apparatus, or both the first and second local managing apparatuses, are caused to perform diagnosis, based on the judgment results.

In at least one embodiment of the present invention, diagnosis request may be issued to one or the other of the first local managing apparatus and the second local managing apparatus, or both of the first and second local managing apparatuses.

Also, in at least one embodiment of the present invention, a list of equipment connected to the local network may be displayed on a display unit.

Service personnel may be notified to go and perform recovery work in the event that trouble is not determined by the first local managing apparatus or the second local managing apparatus, and in this case, information may be transferred to a portable terminal carried by the service personnel regarding the location to which to go to perform recovery work.

Further, report information indicating the contents of trouble may be generated in the event that trouble is determined by the first local managing apparatus or the second local managing apparatus. Notification of commissioning recovery work may be made to another company, in the event that the trouble cannot be recovered without external help.

The equipment of the first type may be peripheral devices, and the equipment of the second type is computer devices, and in this case, the equipment of the first type may be at least one of printers, photocopiers, or scanners, and the equipment of the second type may be at least one of personal computers, server computers, or network devices.

Further objects, features and advantages of the present invention will become apparent from the following description of the preferred embodiments with reference to the attached drawings.

BRIEF DESCRIPTION OF THE DRAWINGS

FIG. 8 is a diagram illustrating an example of a message format exchanged between the device center server 210 and the device monitoring server 203a;

FIG. 17 is a flowchart illustrating the processing procedures at a site plug-in 203b with regard to a message or even issued to the plug-in;

FIG. 26 is a diagram illustrating a case wherein isolation is possible;

FIG. 27, which consists of FIGS. 27A and 27B, is a diagram illustrating an example of a dispatching screen;

FIG. 28 is a diagram illustrating the contents of a commissioning sheet;

FIG. 29 is a diagram illustrating the contents of a work report; and

FIG. 30 is a diagram illustrating the contents of a trouble report.

DESCRIPTION OF THE PREFERRED EMBODIMENTS

<Configuration of First Remote Site Managing System>

A remote site managing system according to the present invention will be described with reference to the drawings.

Figure 1:
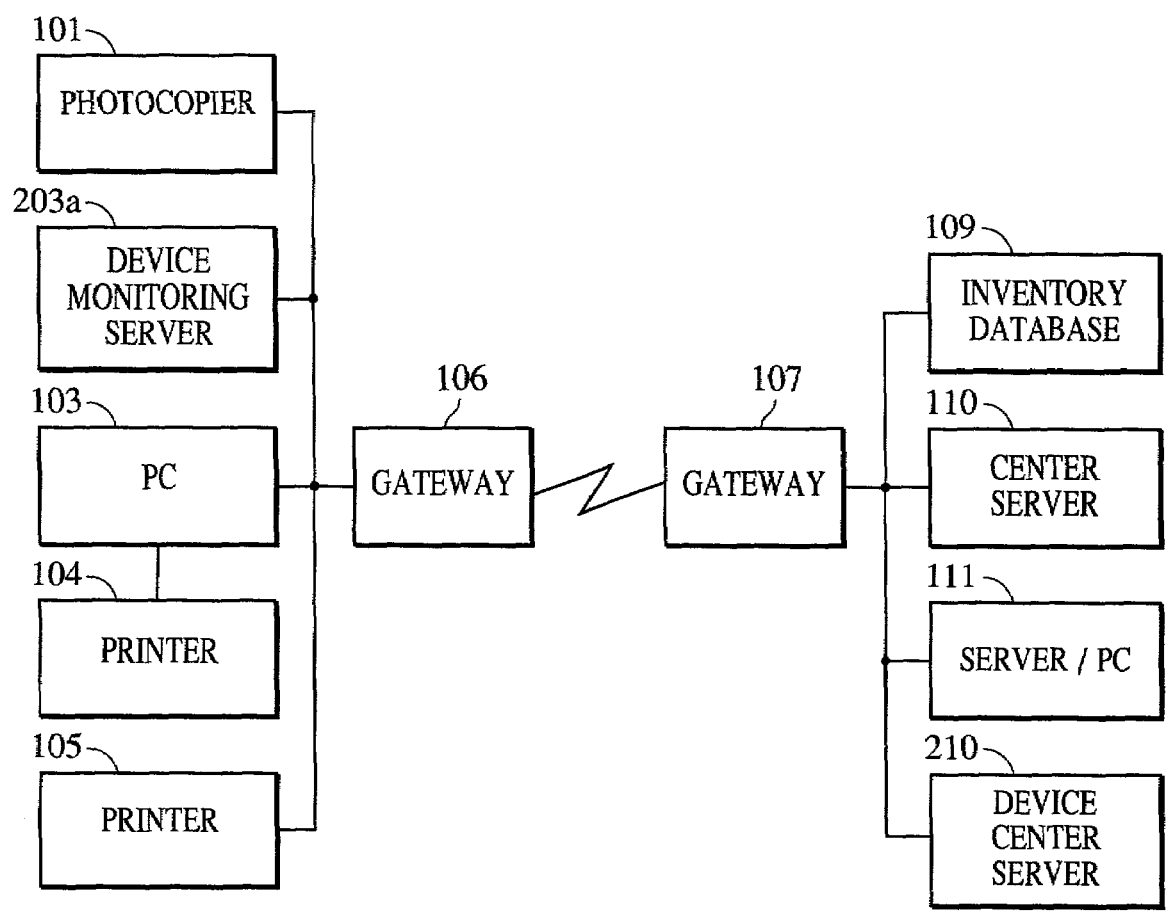
FIG. 1 is a block diagram illustrating the configuration of a managed site and a managing site.

FIG. 1 is a block diagram illustrating the configuration of a managed site (office side) and a managing side (maintenance service company side) making up the remote site managing system. At the managed site, a PC 103 which is a general-purpose computer, a device monitoring server 203a (information equipment for managing peripheral equipment which are devices connected on a local network in the office), and a photocopier 101, printer 104, and printer 105, which are all peripheral equipment, are connected via a LAN (Local Area Network).

Note that here, the term "general-use computer" refers not only to personal computers and server computers, but also to network equipment indispensable for computer networks, such as gateways, routers, and so forth. The term "peripheral equipment" includes photocopiers, printers, scanners, facsimile devices, combined apparatuses thereof, and so forth.

A later-described PC monitoring client module is executed on the PC 103, which is capable of managing the general-purpose computers and the like connected on the local network in the office. Also, the device monitoring server 203a and the PC monitoring client module may be executed on physically separate computers, or may be executed on the same computer.

Also, while not shown in FIG. 1, this remote site managing system also comprises a data format converting device. This is a device for converting and adjusting the data formats between the device monitoring server 203a and the PC monitoring client module.

Also, the managing site has a center server 110 for centrally managing the equipment in the managed site, an inventory database 109 for accumulating managing information and the like, and a device center server 210 for managing the peripheral equipment in the managed site in a dedicated manner, respectively connected to the LAN. Also, with this system, a server/PC 111 and other computers are also connected. This computer 111 uses managing information to execute an application program for comprehensively managing the office equipment.

Also, though not shown in FIG. 1, the managing site also has a display device for display information notified from the managed site, and a converting device for converting and adjusting the data formats between the center server 110 and the device center server 210.

Also, there is a service center for comprehensively managing multiple managing sites (equivalent to the application system 205 in FIG. 2), which are connected with the managing site via an external network or a LAN.

The managed site and the managing site are mutually connected via the gateways 106 and 107. This connecting may be made using general-purpose routers or modems or the like, as well. Also, in the event that the PC monitoring client module is being executed on the PC 103, an arrangement may be used wherein the line between the PC 103 and the center server 110, and the line between the device monitoring server 203*a* and the device center sever 210 are provided separately and exist independently.

Figure 3:
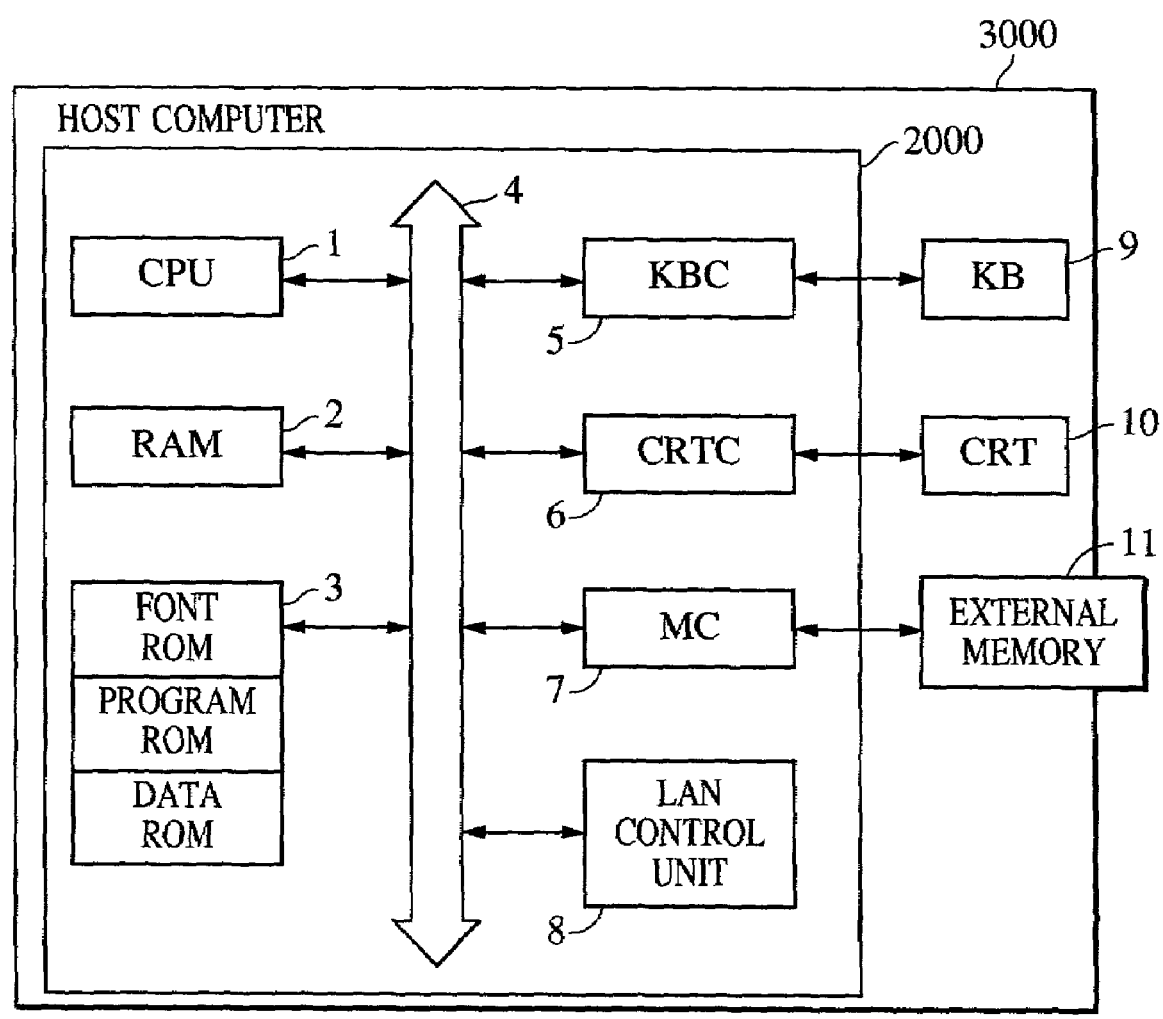
FIG. 3 is a block diagram illustrating the configuration of a computer which serves as the PCs and server.

FIG. 3 is a block diagram illustrating a configuration of a PC and server computer. In FIG. 3, a computer 3000 comprises a CPU 1, RAM 2, ROM 3, a system bus 4, a keyboard controller 5, a CRT controller 6, a memory controller 7, a LAN control unit 8, a keyboard 9, a CRT display 10, and external memory 11.

The CPU 1 executes a communication control program stored in the program ROM of the ROM 3, and accordingly controls external transmission of specified data and controls external reception of data. Also, the CPU 1 comprehensively controls the devices connected to the system bus 4.

The RAM 2 functions as main memory, a work area, and so forth, for the CPU 1. The ROM stores fonts (in the font ROM), programs (in the program ROM), and data (in the data ROM). The keyboard controller 5 controls key input from the keyboard 9 and from a printing device not shown in the diagram. The CRT controller 6 controls display of the CRT display 10. The memory controller 7 controls access to the external memory 11. External memory 11, such as hard disks (HD) and floppy disks (FD), store boot programs, various types of applications, font data, user files, later-described editing files, and so forth. The LAN control unit 8 is connected to the network, and executes communication processing with other equipment connected to the network.

Figure 2:
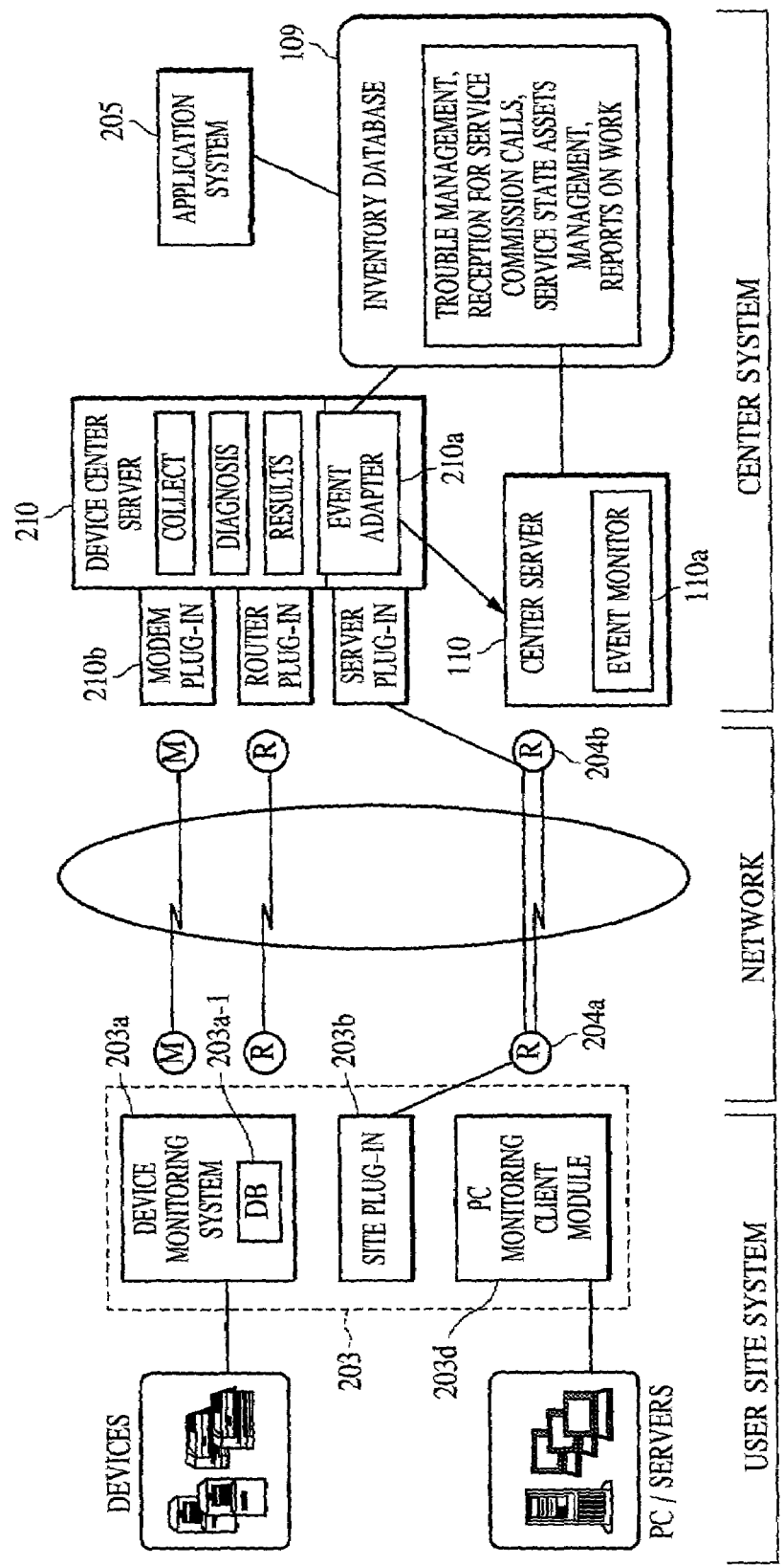
FIG. 2 is a block diagram illustrating the configuration of a software module of the present remote site managing system.

FIG. 2 is a block diagram illustrating the configuration of the software module of the present remote site managing system. A user site system (referring to the managed site) has device equipment (photocopiers, printers combined apparatus, scanners, facsimile devices, and like peripheral devices) and PC/server equipment (general-purpose computers and the like) existing in a mixed manner. However, the device equipment is locally managed by the device monitoring server 203*a*, and the PC/sever equipment is locally managed by a PC monitoring client module 203*d*. These are collectively referred to as a site-side managing system 203. The device monitoring server 203*a* has a database 203*a*-1 for storing managing information.

A center system (referring to the managing site) has a device center server 210 for exchanging data with the device monitoring server 203*a*, and a center server 110 for exchanging data with the PC monitoring client module 203*d*. The managing information of the device equipment is stored in the inventory database 109. Also, the managing information managed by the center server 110 is stored in the inventory database 109. Both of these sets of managing information stored in the inventory database 109 are used by the application system 205 and so forth. Note that the inventory database 109 needs to be logically separated between the devices and the PC/servers or like general-purpose computers, and of course may be physically separated.

The device monitoring server 203*a* and the device center server 210 are connected with a site plug-in module 203*b* for converting data formats and procedures as necessary, via a server plug-in module. Due to the site plug-in module and server plug-in module, the site side and the center side can communicate, even in the event that the operating systems used by each site are different. Electrically, these are connected via routers 204*a* and 204*b*. This line is physically or logically shared with a line connecting the PC monitoring client 203*d* and the center server 110.

The line connecting the device center server 210 and the device monitoring server 230*a* also takes into consideration cases wherein the line connecting the monitoring client 203*d* and the center server is not shared. In this case, the PC monitoring client 203*d* and the center server 110 may be connected by an independent line, via modems or routers.

The center server 110 contains an event monitor 110*a*, which monitors events issued to the center server 110, and in the case that there is an event notifying of trouble, failure, error, or the like, this is displayed on a monitor. The administrator can tell the state of trouble which has occurred at the managed site, by viewing the display. An event adapter 210*a*, the PC monitoring client 203*d*, and application system 205, are those which issue events to the center server 110. The center server 110 executes predetermined processing of the received event following the contents indicated thereby. An example of an event is trouble notification.

The device center sever 210 contains an event adapter module 210*a*. The event adapter 210*a* has functions of periodically searching for information received by being sent from the device monitoring server 203*a* to the device center server 210, judges and sorts, from the searched information, information relating to the trouble which has occurred in the peripheral equipment, converts the information into a format which can be processed by the center server 110 (file format, protocol format, etc.), and then issues, to the center server 110, an event indicating that trouble has occurred. Alternately, an arrangement may be made wherein the center server 110 is provided with functions for converting the information into a format which can be processed by the center server 110, by the event adapter module 210*a*. Trouble-related events (trouble events) contain the device where the trouble occurred, the contents thereof, the time that the trouble occurred, and so forth. Providing this event adapter 203*a* to the present system and the devices allows device-specific information such as paper jamming or stapling function checking obtained by managing software using the device-specific protocol format to be centrally managed along with software monitoring systems or devices of other types (in the embodiment, general-purpose computers/servers, etc.).

The event monitor 110*a* receives this, and adds to the event list and displays the device where the trouble occurred, the contents thereof, the time that the trouble occurred, and so forth. An example of making this display is to display one event per line, and list the events in time-sequence. FIG. 2 shows an arrangement wherein the event monitor 110*a* is contained in the center server 110, but connecting this event monitor 110*a* externally from the center server 110 via a network or the like enables, for example, the device center server 210 side or application system 205 side, to comprehensively manage the devices and servers.

What is most noteworthy here is that the event monitor 110*a* displays any and all trouble events, without giving consideration to the source of the event, thereby gaining the attention of the administrator. That is to say, the event monitor 110*a* displays, in time-sequence fashion for example, in an event list on the same screen, both general-purpose computer trouble events issued from the PC monitoring client 203*d*, and peripheral equipment trouble events issued from the device monitoring server 203*a* via the event adapter 210*a* of the device center server 210.

Next, examples of data exchanging procedures carried out between the device center server 210 and the device monitoring server 203*a* will be described with regard to the three cases of: (1) downloading setting values from the device center sever 210 to a device; (2) uploading log data from the device monitoring server 203a to the device center server 210; and (3) the device center server 210 requesting counter data from device monitoring server 203a, with reference to FIG. 4. However, a brief description regarding the data format will be given first.

FIG. 8 is a diagram illustrating an example of a message format exchanged between the device center server 210 and the device monitoring server 203a. A message includes a flag field, a data type field, a job ID field, a return value field, a data length field, and a data field. The flag field contains a bit group indicating communication means, and a bit indicating whether or not that message is the final frame of the data (whether data is continuous).

The data type field indicates that, for example, the data is verification request data (data transmitted at the beginning of a session), settings values data to be downloaded, a later-described device information request, an event information notification, a log data processing request, or the like. With notification of trouble or the like, for example, the fact that this is event information is indicated by data type, and specific contents are indicated in the data field.

The job ID indicates the type of session, indicating parameter settings, obtain device information, event notification, and so forth. The data field length indicates the length of the subsequent data, and the data field stores data of the length indicated in the data length. Data is included in the data field in the cases of downloading settings values and log data processing requests. Also, for counter uploads, device information is included in the data field in a response corresponding to a device information request.

The device center server 210 and the device monitoring server 203a carry out processing while exchanging these messages, in the following and other procedures. Note that in the following description, the term "event" is used to mean a message which makes a notification that an event has occurred.

<Settings Values Downloading Procedures>

Figure 4:
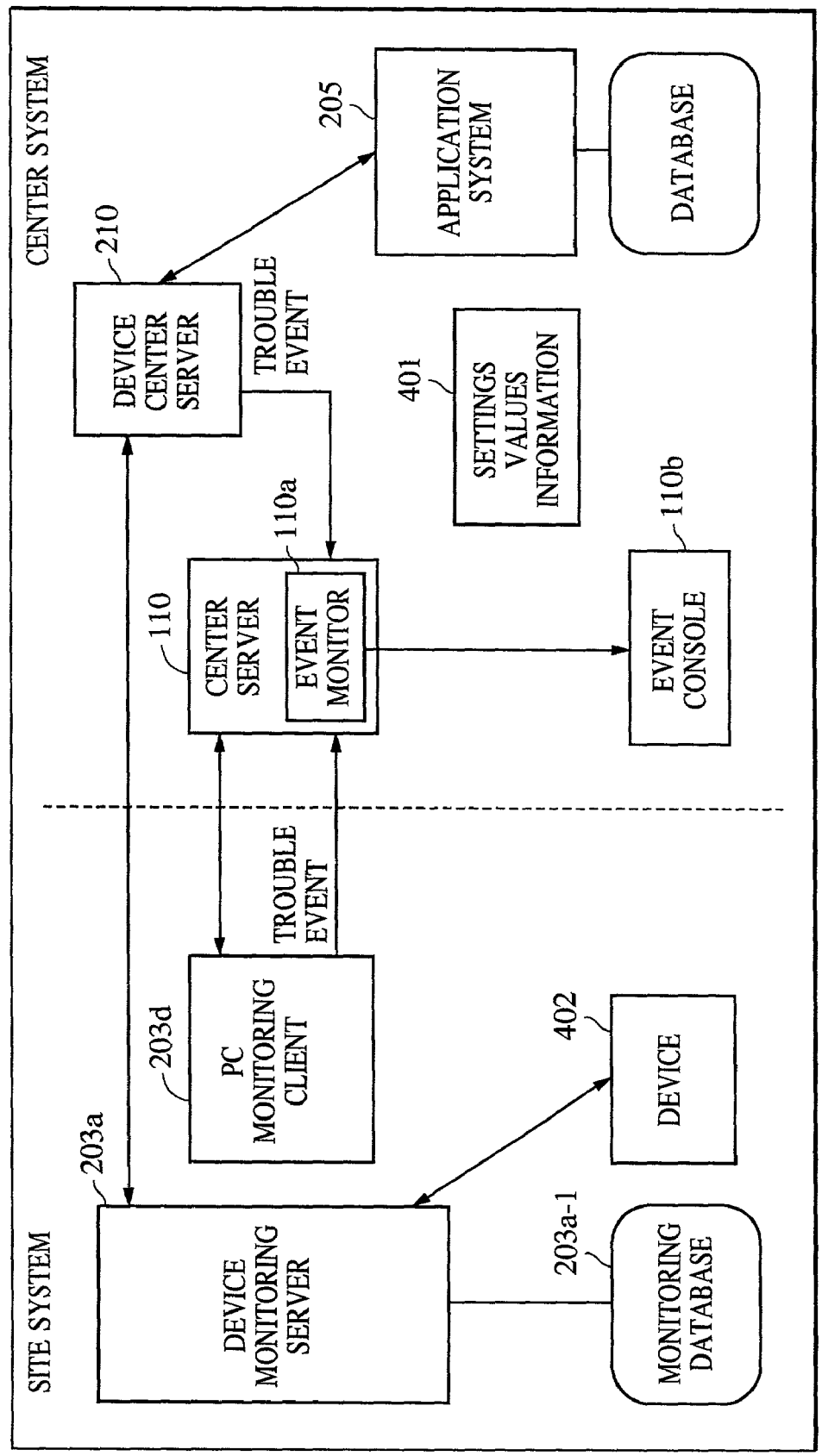
FIG. 4 is a block diagram for describing the procedures for exchanging data which is carried out between site systems and the center system.

FIG. 4 is a block diagram for describing the procedures of data exchanging carried out between the site system and center system.

Setting values are downloaded as follows.

(1) At the application system 205, specifications for the device to be set, the IP address of the device, threshold values for notifying an error or likewise alarm to the site device server of the device, and like settings values are manually or otherwise input, thereby creating a settings values information file 401.

(2) A session is established with the device center server 210 by the application system 205, and the settings values data contained in the settings values information file 401 is transmitted to the device center server 210.

(3) Upon receiving the settings values data, the device center server 210 establishes a session with the device monitoring server 203a, and sends the settings values data to the device monitoring server 203a.

(4) Upon receiving the settings values data, the device monitoring server 203a sends the settings values to the device 402. This procedure is performed according to specific procedures for each device.

(5) When the device settings are completed, the device monitoring server 203a sends a settings completion message to the device center server 210.

(6) The device center server 210 transmits a settings completion notification to the application system 205.

Subsequently, the application system 205 releases the session with the device center server 210, and the device center server 210 releases the session with the device monitoring server 203a.

Thus, the settings information for the device can be downloaded to the device 402 by the device monitoring server 203a and the device center server 210 directly communicating with one another.

Now, trouble is handled as follows.

(7) In the event of the PC monitoring client 203d detecting trouble of some sort at a server or PC issuing a trouble event, the PC monitoring client 203d directly issues an event to the center server 110.

(8) Also, in the case that the device monitoring server 203a detects trouble in the device 402, the device monitoring server 203a transmits information thereof to the device center server 210.

(9) Upon receiving notification of trouble at the device 402, the device center server 210 issues an event message notifying of the occurrence of the trouble to the center sever 110, based on the received notification of trouble. The device center server 210 shown in FIG. 4 is illustrated containing the event adapter 210a shown in FIG. 2, so the trouble event shown in FIG. 4 is issued from the event adapter 210a.

(10) Since the event is a trouble event, the event monitor 110a displays the trouble information on the event console 110b, and updates the event list.

Thus, an event notifying of trouble passes through the center server 110 regardless of which devices or general-purpose computers of the managed site that the event is generated at, and the administrator can monitor the device-related information or general-purpose computer-related information of all the devices and general-purpose computers in the managed site simply by monitoring the event console on the center server. Also, arrangements may be conceived wherein information displayed on the event console are printed out or subjected to processing so as to be displayed on portable terminals or the like carried by service personnel. The printed information may be mailed to the managed site, and the information displayed on portable terminals carried by service personnel may be used for dispatching service personnel and so forth. Various applications of such information wherein the devices and the general-purpose PC/servers are centrally managed can be conceived.

In the above description, the arrangement wherein device trouble is displayed on the event console 110b via the event monitor 110a shown in FIG. 4 has been referred to, but it should be noted that with the present invention, not all trouble information occurring in the devices is displayed on the event console 110b. In this regard, the present system has functions for performing judgment processing regarding whether or not to transmit the trouble information to the device center server 210 according to the level of trouble occurring in the device equipment. For example, in the case of door-open errors with photocopiers or the like, errors which can be recovered from by resetting with the power on/off functions of the device equipment, etc., notification is not provided by the device monitoring server 203a to the device center server 210. On the other hand, of the information of which the center server is notified, errors which can be handed by the customer on-site, e.g., errors which are not problems for current operations such as a temperature increase of the device, or jam errors, do not warrant calling up service personnel. As long as a judgment function database for whether to notify trouble to the center server is stored in any of the device-side equipment, such as the monitoring database 203a-1 or the device 402, judgment as to whether to notify the center side of the information from the device side can be made. Also, as long as a judgment function database regarding whether to display trouble information notified to the center server 110 on the event console 110b, and whether to notify service personnel, is stored in any of the center server side equipment such as the center server side application system 205, inventory database 109, center server 110, etc., the functions of the present invention can be achieved.

The present system having such filtering functions for sending information allows the amount of traffic between the sites and the center to be reduced, and also allows the administrator managing the center to readily and clearly recognize critical error information.

<Counter Uploading Procedures>

Counter values uploading procedures, i.e., collection of device information, is carried out as follows. The counter values are values indicating the number of pages printed at a photocopier or printer, mode counts indicating how many modes of a device have been used, and so forth, and these counter values are values which serve as the basis for calculating maintenance fees. Uploading these values according to requests from the center system enables device information such as the counter values to be taken by a remote site. The counter upload is performed according to requests from an application, so the center system (managing site) is the initiator.

(1) A session is established by the application system 205, and a device information request is transmitted to the device center server 210. The device information request contains information and the like for specifying the object device in the site system.

(2) Upon receiving the device information request, the device center server 210 establishes a session with the device monitoring server 203a, and transmits the device information request to the device monitoring server 203a.

(3) Upon receiving the device information request, the device monitoring server 203a obtains the device information from the specified device. This procedure is carried out according to predetermined procedures for each device, and predetermined information or specified information is obtained for the specific device.

(4) Upon obtaining the device information, the device monitoring server 203a transmits a device information response containing the obtained device information to the device center server 210.

(5) The device center server 210 transmits the device information response to the application system 205.

Subsequently, the application system 205 releases the session with the device center server 210, and the device center server 210 releases the session with the device monitoring server 203a.

Thus, device information can be obtained by the device monitoring server 203a and the device center server 210 directly communicating with one another.

Note that trouble is handled in the same manner as with downloading settings values.

<Log Data Uploading Procedures>

Uploading of log data is performed as follows. Log data is a history of warnings or retry information occurring in peripheral equipment, for example, and even in the case that this does not consist of an error, the log information is voluntarily transmitted to the managing site in the case that some sort of abnormal state may be occurring, such as the number of warnings reaching a predetermined number, for example. Accordingly, unlike the counter upload, the managed site (site system) is the initiator for uploading log data.

(1) The device monitoring server 203a collects the log of the device. In the case that the amount exceeds a predetermined value, or in the case that the frequency of occurrence of warnings exceeds a certain rate, the device monitoring server 203a starts uploading log data.

(2) First, the device monitoring server 203a establishes a session, and transmits a log data processing request containing the log data, to the device center server 210.

(3) Upon receiving the log data processing request, the device monitoring server 203a establishes a session with the device center server 210, and transmits a log processing request to the device center server 210.

(4) Upon receiving the log data processing request, the device center server 210 establishes a session with the application system 205, and transmits the log data processing request to the application system 205 for processing the log data.

(5) Upon receiving the log data processing request, the application system 205 processes the log data received therewith, and transmits a log data processing response to the device center server 210.

(6) The device center server 210 transmits the log data processing response to the device monitoring server 203a.

(7) The device monitoring server 203a releases the session with the device center server 210, and performs post-operations. In the post-operations, in the case that the log data processing response indicates that the processing of the log data has been properly completed, the device monitoring server 203a also deletes the log data and so forth.

Subsequently, the device center server 210 releases the session with the application system 205.

Thus, log information can be uploaded, due to the device monitoring server 203a and the device center server 210 directly communicating with another.

Note that trouble is handled in the same manner as with downloading settings values.

<Processing Procedures by the Device Center Server>

Figure 5:
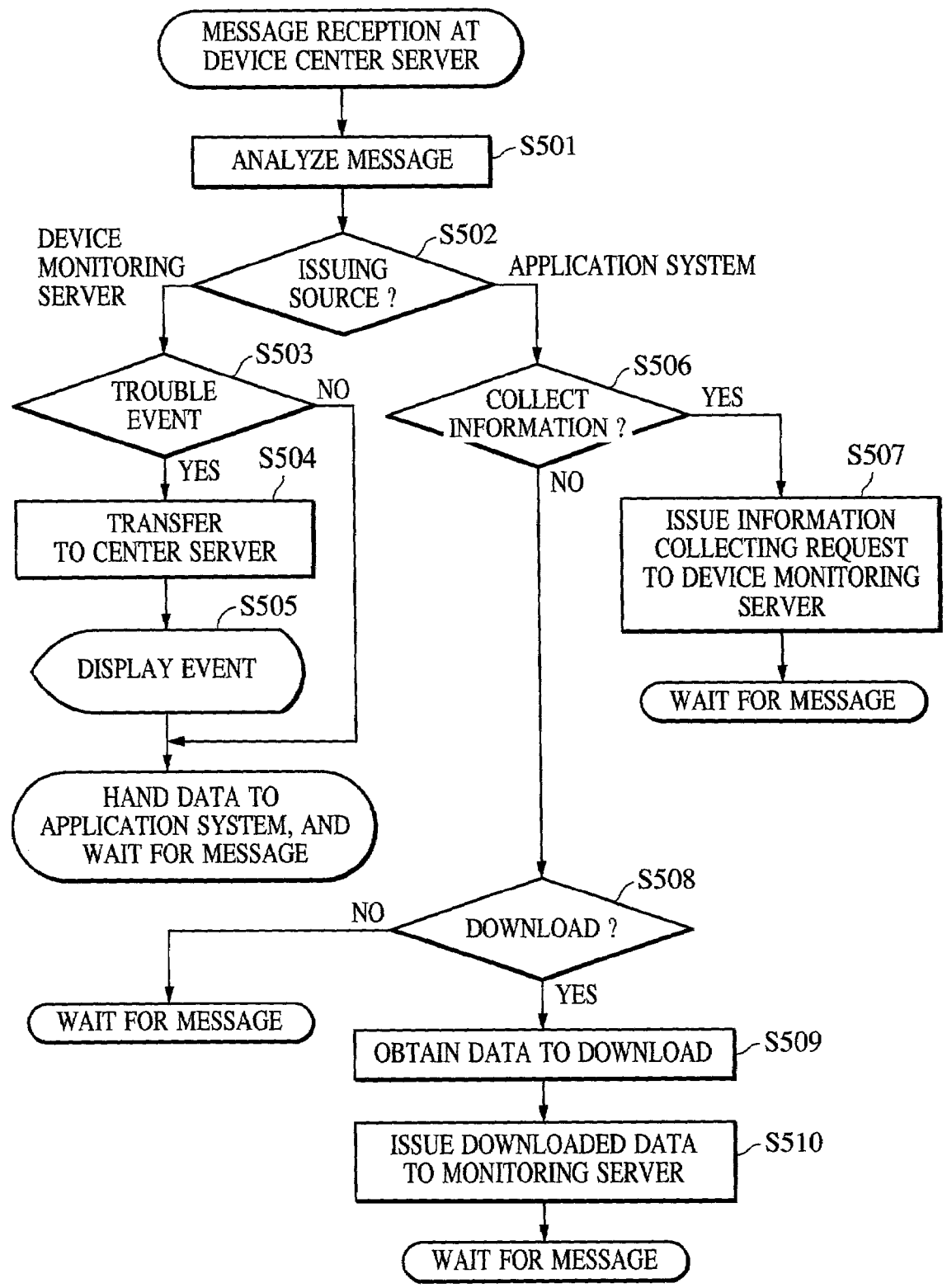
FIG. 5 is a flowchart for describing the processing procedures for receiving messages at a device center server.

Next, the processing procedures at the device center server 210 and the device monitoring server 203a will be briefly illustrated. FIG. 5 is a flowchart illustrating the processing procedures at the device center server at the time of receiving a message. Note that this message is not restricted to that from the device monitoring server, and may be received from the application system 205 as well. The format of this message may be different to that shown in FIG. 8. In any case, either the originator of the message can be identified, or a separate process is executed according to the originator. The present embodiment employs the former of the two.

Upon receiving a message, the processing in FIG. 5 is started. First, the received message is analyzed (step S501), and the originator is determined (step S502). The originator may add an address or the like to the message, but can also be identified by the contents. For example, in the case of a log processing request, the originator is the device monitoring server, in the case of a settings values download request, the originator is the application system.

In the case that the originator is the device monitoring server 203a, judgment is made whether the message is a trouble event (step S503), and in the case that the message is a trouble event, the message is converted into a format which can be processed by the center server 110, and is transferred to the center server 110 (step S504). The center server 110 reads out the location, contents, time, etc., of the trouble, from the data contained in the message, which is then displayed (step S505). In the case that the message is not a trouble event, the data is handed to the application system and processing according to the message is performed, following which the flow stands by for the next message. Examples of processing handed to the application system include log data processing requests and collected device information.

On the other hand, in the case that the originator is an application system, judgment is made regarding whether or not the message thereof is a device information collection request (step S506). In the case that the message is a device information collection request, a device information collection request is issued to the device monitoring server 203a, and the flow stands by to receive a message.

In the case that this is not a device information collection request, judgment is made regarding whether this is a download request (step S508). In the case that this is a download request, the received downloaded information is obtained (step S509), and a call is made thereof to the device monitoring server 203a (step S510). In a case that this is not a download request, the process stands by for the next message.

<Processing Procedures by Device Monitoring Server>

Figure 6:
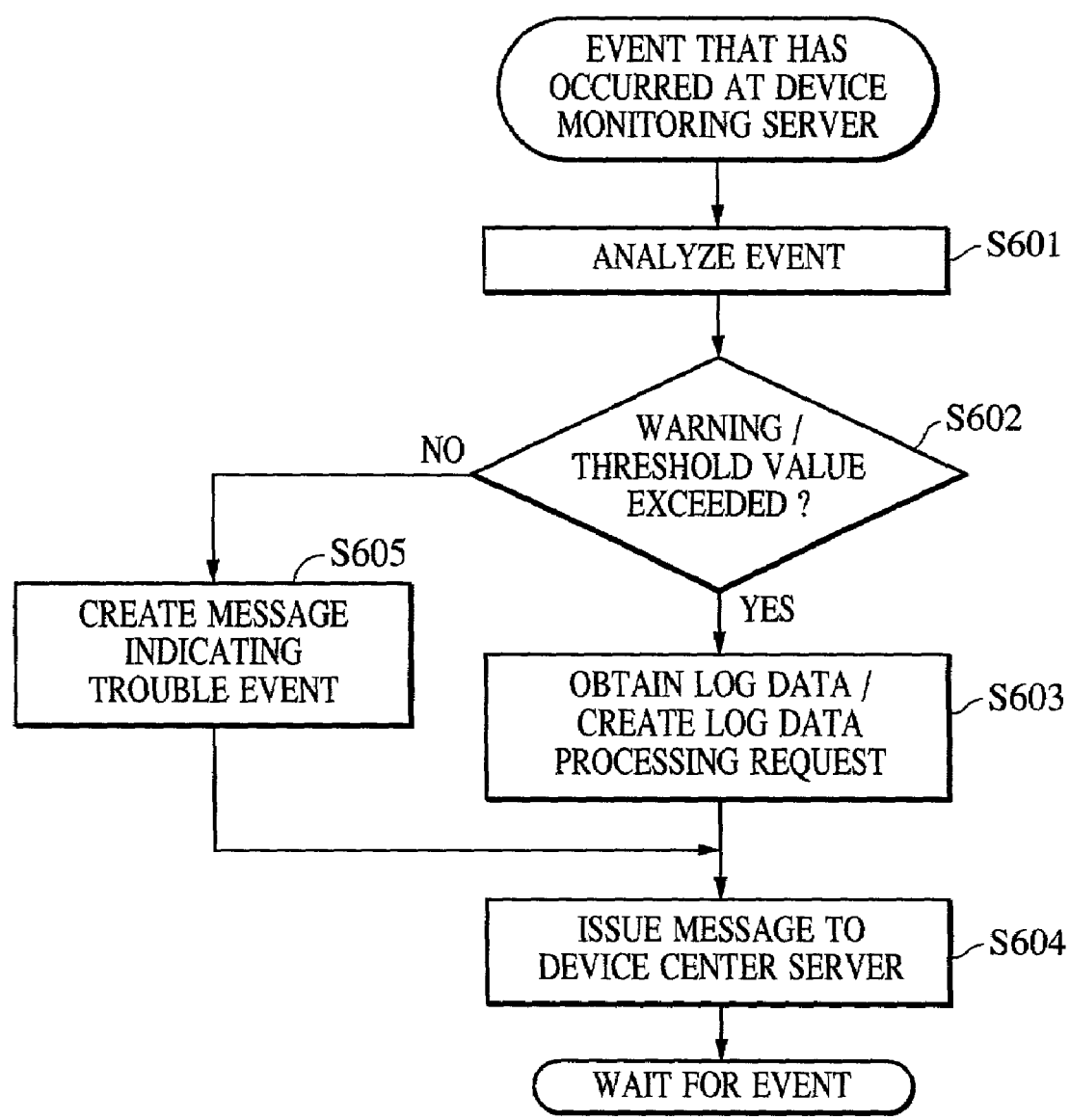
FIG. 6 is a flowchart illustrating the processing procedures of the device monitoring server 203a with regard to an event that has occurred.

FIG. 6 is a flowchart illustrating processing procedures regarding events occurring at the device monitoring server 203a.

In the case that an event of some sort occurs, the event that has occurred is analyzed (step S601), and in the case that this is a warning from a device and a predetermined threshold has been exceeded (step S602), the log data that has been accumulated so far is obtained, and a log data processing request message is created (step S603), the log processing request then being issued to the device center server 210. In the case that the threshold has not been exceeded, this fact is stored in the log.

On the other hand, in the case that this is not a warning, this is taken to be an error that has occurred with the present embodiment, so a message indicating a trouble event is created (step S605), which is transmitted to the device center server 210 in step S604.

Figure 7:
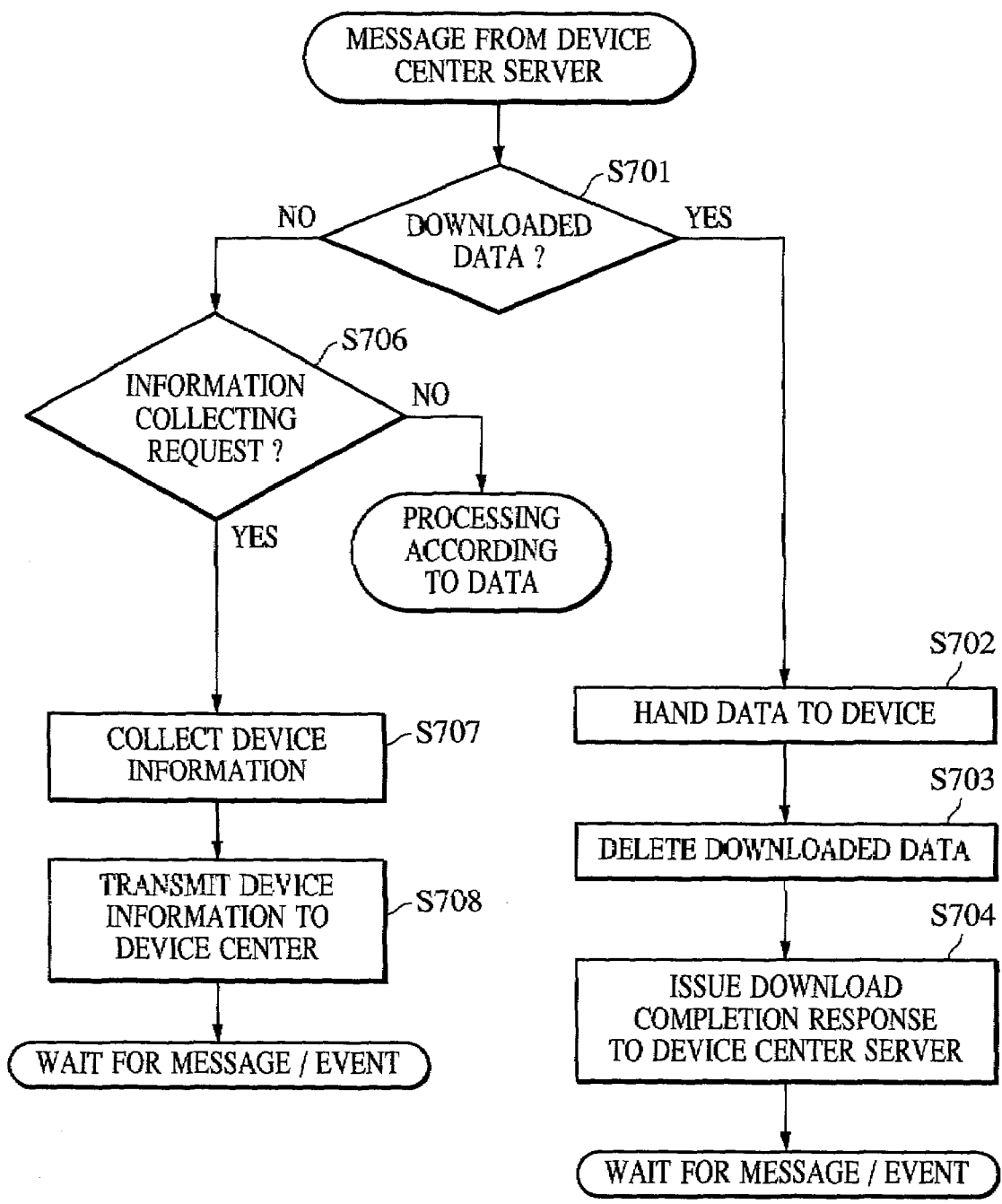
FIG. 7 is a flowchart illustrating the procedures for the device monitoring server 203a to receive messages received from the device center server 210.

FIG. 7 is a flowchart illustrating the procedures for the device monitoring server 203a to receive a message from the device center server 210.

First, judgment is made regarding whether the received message is a download request for settings values (step S701). In the case that this is for a download, settings based on the received settings data are carried out between the device monitoring server 203a and the device (step S702), the site plug-in 203b deletes the data (step S703), and a response message is issued to the device center server 210 to the effect that the download has completed (step S704). Note that it is sufficient for the site plug-in 203b to be logically connected to the device monitoring server 203a, and in the event that there is no connection, these may be physically separated.

In the case that this is not a download in step S701, judgment is made whether or not this is a device information collecting request (step S706). If so, information is collected from the specified device (step S707), and the device information is transmitted to the device center server (step S708).

According to the above procedures, trouble events from the managing system for the general-purpose computers and the managing system for the peripheral equipment can be centrally managed as unified information at the managing site side. Also, the present invention is not restricted to matching device managing information to PC/server managing software; rather, the reverse can be true, i.e., PC/server managing information may be made to match device managing software. For example, the event adapter 210a shown in FIG. 2 may be provided to the center server 110, so that events occurring at the device server are notified to the device center server 210.

Also, as shown in FIG. 2, an arrangement may be made wherein the line which connects the device monitoring server 203a and the device center server 210, and the line which connects the PC monitoring client 203d and the center server 110 are the same line, shared with a router or the like, thereby conserving the number of lines. This is effective in the event of using dedicated lines for the lines, and so forth.

<Configuration of Second Remote Site Managing System>

A remote site managing system according to a second embodiment of the present invention will be described with reference to FIG. 9. The system according to the present embodiment differs with the first embodiment in the manner of having logical channels between the managing site and managed site. With the first embodiment, while communication lines can be shared, the channel connecting the device monitoring server 203a and the device center server 210, and the channel connecting the PC monitoring client 203d and the center server 110 are mutually independent and separate channels, logically. The event monitor can centrally handle trouble events by an event notifying trouble being transmitted to the center server 110 in the case that the device center server 210 receives a trouble event notification from the device monitoring server 203a.

Conversely, with the present embodiment, there is neither a device center server 210 nor a channel connecting the device monitoring server 203a and device center server 210. Instead of the device center server, a device information processing module 901 is provided at the center server 110 (indicated separately in FIG. 9), so that the center server 110 processes the information for the devices that has been received. With this configuration, in the event that a commercially-available PC monitoring client 203d and a center server 110 are used, device-related messages are also carried by the channel established therebetween. Thus, in addition to the advantage of sharing lines as described with the first embodiment, there is the further advantage that there is no need to prepare an independent communication channel for the device information, and there is no need to separately provide a device center server, either.

<System Configuration>

Figure 9:
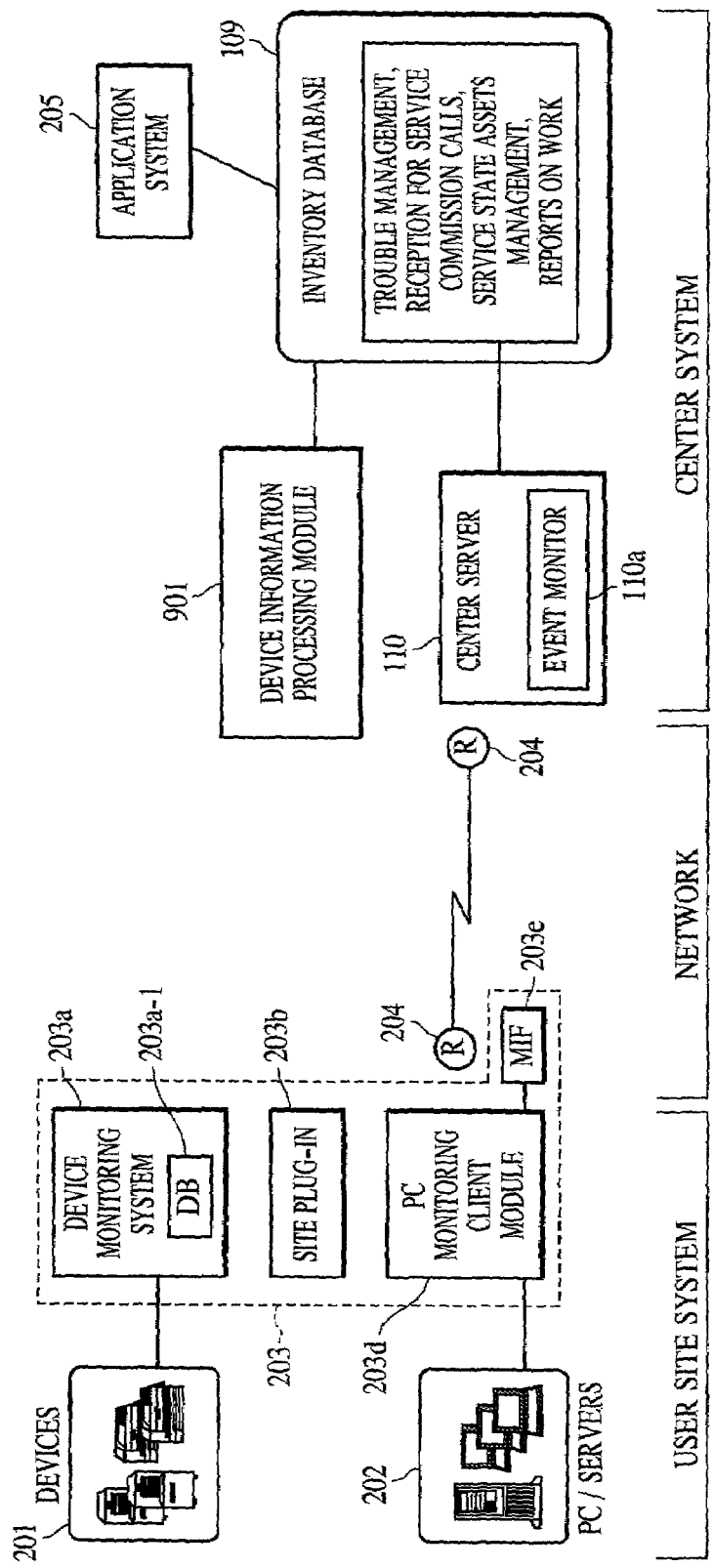
FIG. 9 is a block diagram illustrating the configuration of a software module of the remote site managing system according to the present embodiment.

FIG. 9 is a block diagram illustrating the configuration of the software module of the remote site managing system according to the present invention. A user site system (referring to the managed site) has device equipment (photocopiers, printers, scanners, facsimile devices, combined apparatuses, and like peripheral devices) and PC/server equipment (general-purpose computers) existing in a mixed manner, wherein the device equipment is managed by the device monitoring server 203a, and the PC/server equipment is locally managed by a PC monitoring client 203d. The present embodiment is the same as the first embodiment in this regard.

The center system (referring to the managing site) has the device information processing module 901 for exchanging data with the device monitoring server 203a, and a data server 110 for exchanging data with the PC monitoring client 203d. The managing information of the device equipment and the PC/server managing information is stored in the inventory database 109. While this is shown as one database in FIG. 9, the database should be logically or physically separated between the devices and the PC/servers. This information is used by the application system 205, center server 110, and so forth. This also is the same as with the first embodiment.

The managing site and the managed site are connected with a single line, connected by routers 204. The PC monitoring client 203d and center server 110 can be realized with a commercially-available site management system. All messages are transmitted and received via a channel configured between the PC monitoring client 203d and center server 110, provided by the commercially-available management system. Note that while in FIG. 9, the device information processing module 901 is illustrated as being independent (equivalent to the device center server 210 in FIG. 2), the present embodiment can also be realized by assembling the functions thereof into the center server 110.

The device monitoring server 203a and the PC monitoring client 203d are connected via a site plug-in module 203b for converting data formats and procedures (protocols) as necessary. That is, the site plug-in module 203b has functions for converting information of the device monitoring server into the format (or protocol) of the PC monitoring client 203d, and for performing reverse conversion. Also, a configuration can be conceived wherein functions the same as the functions of this site plug-in module 203b are provided to the center-side plug-in (equivalent to the server plug-in shown in FIG. 2) which performs exchange of data between the center server 110 and the device processing module 901 at the center side.

As described later, this site plug-in module 203b has the functions of transmitting a message from the device monitoring server 203a to the PC monitoring client 203d and causing this to be transmitted to the specified destination, and also acts to periodically perform polling and searching of the contents of a predetermined data area where the PC monitoring client 203d is to write, and handing any message addressed to the device monitoring server 203a to the device monitoring server 203a.

Also, the center server 110 performs processing according to the received message, i.e., in the case that the contents of the message are information relating to a device, the center server 110 hands the message to the device information processing module for processing, and in the case that the message is one notifying of the occurrence of an event, the center server 110 converts the message into a display format whereby whether the event generated by the event monitor 110a is a display-related event or a PC/server-related event can be recognized, and displays this as an event list. Device-related events are generated from the device information processing module 901.

Thus, providing a plug-in having a format converting function between the device and PC/servers allows the commercially-available management software functions of the PC/servers to be shared, and device-related information can be exchanged between the site side and the managing center side. Also, even device-specific information which commercially-available PC/server managing software cannot manage in detail can be handled by converting data from the PC/server format into the format for the devices for processing at the device information processing module, such that there are no devices required for which the message is transmitted to at the center side. In the event that managing device information in further detail is desired, all that is necessary is to develop a new device information processing module, thereby furthering efficiency of development and design.

Next, examples of message exchanging procedures carried out between the site system (managed site) and the center system (managing site) will be described with regard to the three cases of: (1) downloading setting values from the center server 110 to a device; (2) uploading log data from the device monitoring server 203a to the center server 110; and (3) the center server 110 requesting counter data from device monitoring server 203a, with reference to FIGS. 10 through 12.

<Settings Values Downloading Procedures>

Figure 10:
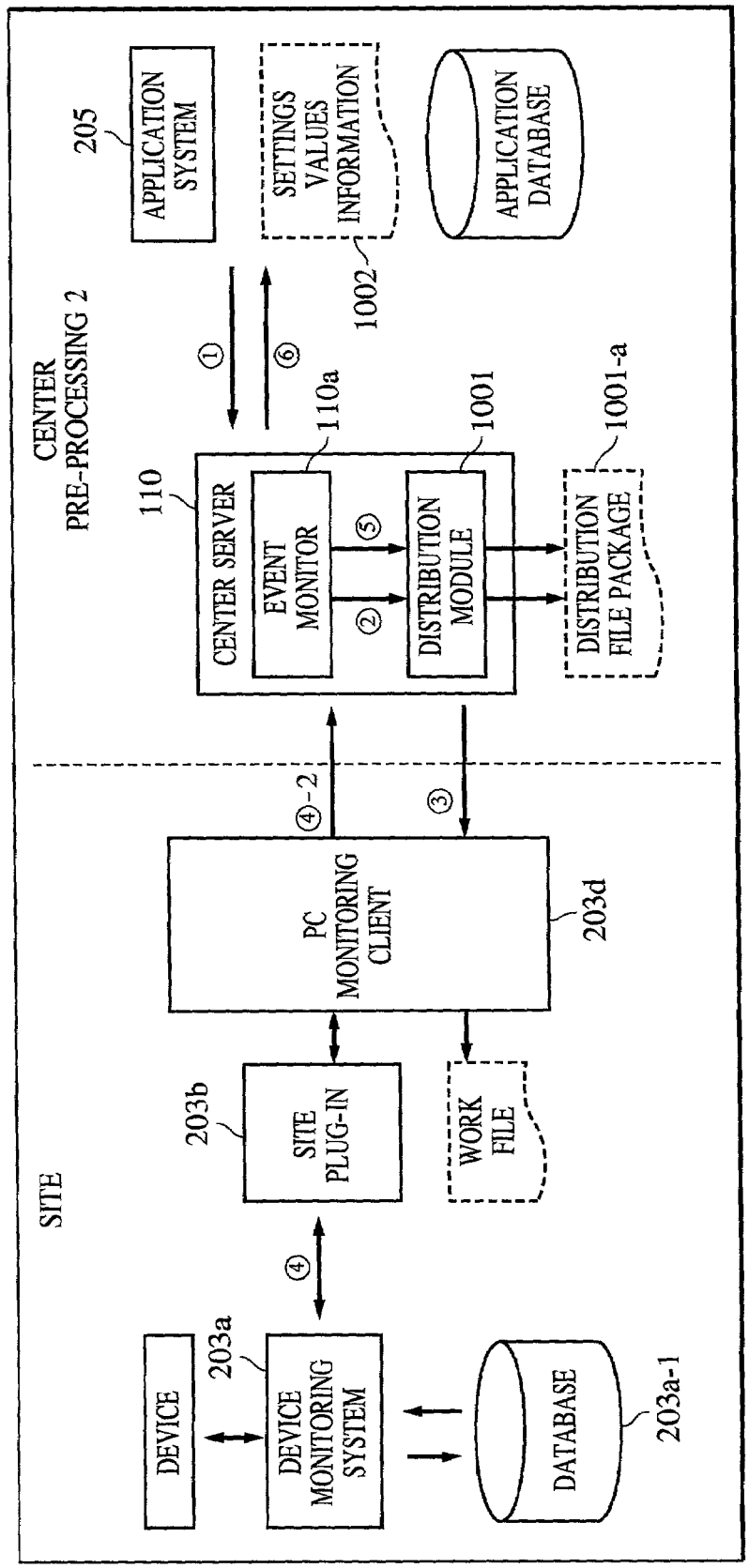
FIG. 10 is a chart for describing the procedures for downloading setting values to a device, carried out between a site system and the center system.

FIG. 10 is a block diagram for describing the procedures for downloading settings values to a device, carried out between the site system and center system. Setting values are downloaded as follows.

First, at the application system 205, specifications for the device to be set, settings values, etc., are manually input, thereby creating a settings values information file 1002.

(1) A session is established with the center server 110 by the application system 205.

(2) A distribution module 1001 is activated at the center server 110, and a distribution file package 1001a is created from the settings values information file 1002.

(3) The distribution module 1001a transmits the distribution package file to the PC monitoring client 203d, and stores this as a work file.

(4) The site plug-in 203b periodically monitors the data files which the PC monitoring client 203d stores, and in the case that the site plug-in 203b detects that the PC monitoring client has created a work file with the PC monitoring client, notification of the arrival of the settings values is made to the device monitoring server 203a, and also the settings values data is handed to the device monitoring server 203a. The device monitoring server 203a sets the set values to the specified device.

(4-2) The site plug-in 203b notifies the center server that the settings have been completed, via the PC monitoring client 203d.

(5) At the center server 110, the distribution module 1001 deletes the distribution package file 1001a.

(6) The center server 110 notifies the application system 205 of the end of the settings.

Thus, device settings information can be downloaded to a device by handing the settings data to the device monitoring server 203a.

Now, with regard to trouble occurring in the devices, this is transmitted as a trouble event from the site plug-in 203b to the center server 110 via the PC monitoring client 203d, as with the above procedure (4-2). Accordingly, events for notifying trouble are processed on the event monitor 110a of the center server 110, and are displayed on the list of events.

<Counter Uploading Procedures>

Figure 11:
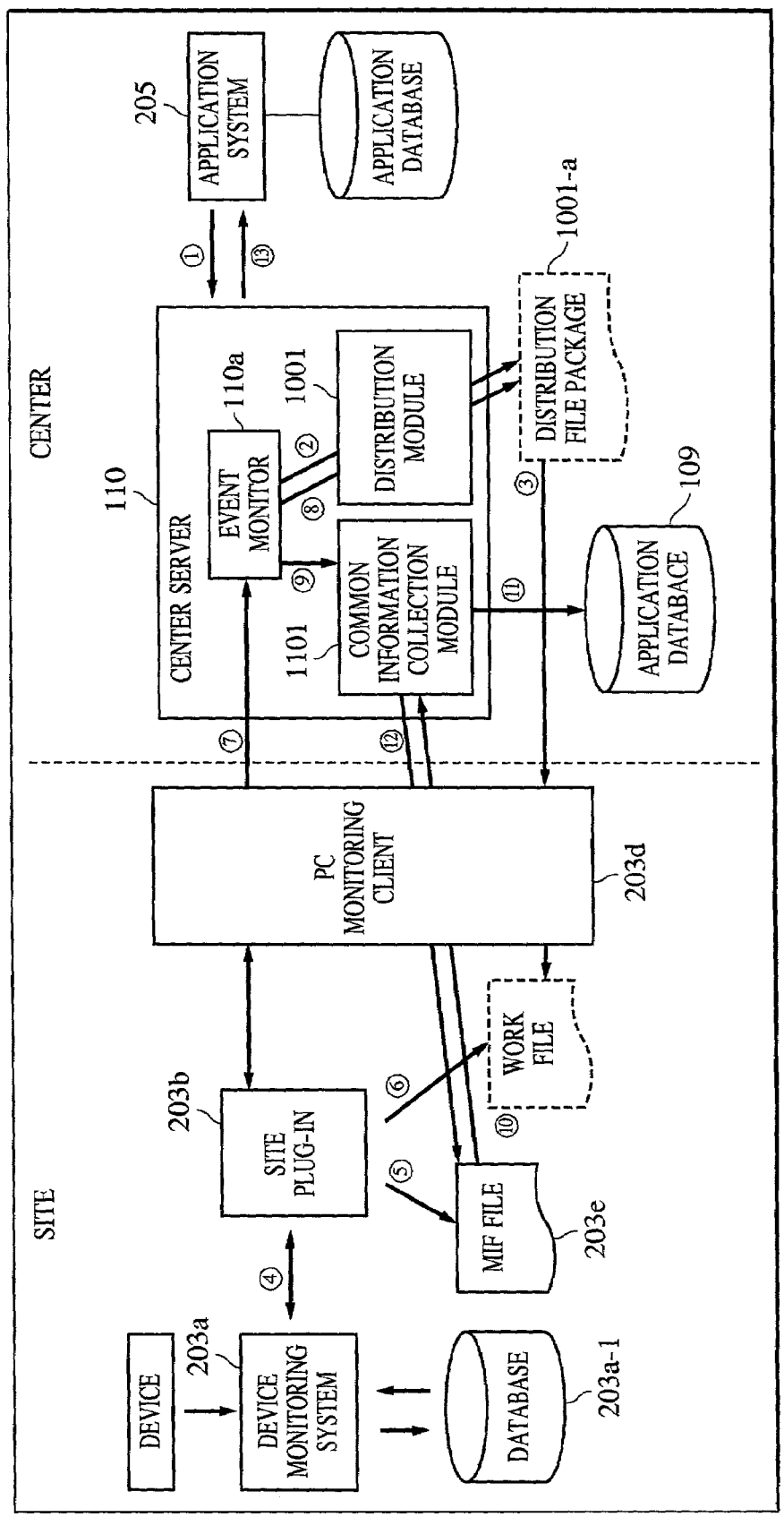
FIG. 11 is a chart for describing the procedures for uploading count data, i.e., device information collection, carried out between the site system and the center system.

FIG. 11 is a chart for describing the counter data uploading that is performed between the site system and center system, i.e., the procedures for collecting device information. Uploading of device information is performed as follows.

(1) The application system 205 stores an information request command in a file, and issues a message (event) to initiate information collection to the center server 110.

(2) The event monitor analyzes the event from the application system 205, activates the distribution module 1001, and creates an information request command distributing file package 1001a.

(3) The center server 110 transmits the created distribution package containing the information request command to the PC monitoring client 203d. The PC monitoring client 203d stores the received file as a work file. This work file is a general-purpose file on the PC/server managing system, and is equivalent to the actual entity of the distribution file package 1001a.

(4) Upon detecting that the PC monitoring server 203d has stored a file, the site plug-in 203b calls this up and hands it to the device monitoring server 203a. The device monitoring server 203a receives this and collects device information from the specified device, and hands this to the site plug-in 203d.

(5) The site plug-in 203b stores the received device information as a predetermined format file 203e. In the present embodiment, description will be made with reference to an example wherein the MIF format is used as the predetermined format. The MIF format is a general file format for information managing systems.

(6) The site plug-in 203b deletes the work file.

(7) The site plug-in creates an event to the effect that an MIF file has been created and transmits this to the center server 110.

(8) The center server 110 receives this event, and deletes the distribution file package.

(9) In the case that the event received from the site plug-in 203b notifies normal completion of information collection, the center server 110 activates a shared information collecting module 1101, and reads in therein the MIF file created by the site plug-in, so as to collect device information.

(10) The shared information collecting module 1101 reads the MIF file 203e, and obtains the collected device information.

(11) The shared information collecting module 1101 stores the obtained device information in the inventory database 109. Note that the inventory database 109 either physically or logically has both device equipment and PC/server equipment databases, and can flexibly handle object equipment.

(12) The center server 110 deletes the MIF file 203e at the site side.

(13) A completion notification is transmitted to the application 205.

Thus, the device information collected by the device monitoring server 203a can be obtained at the center server 110.

<Procedures for Uploading Log Data>

Figure 12:
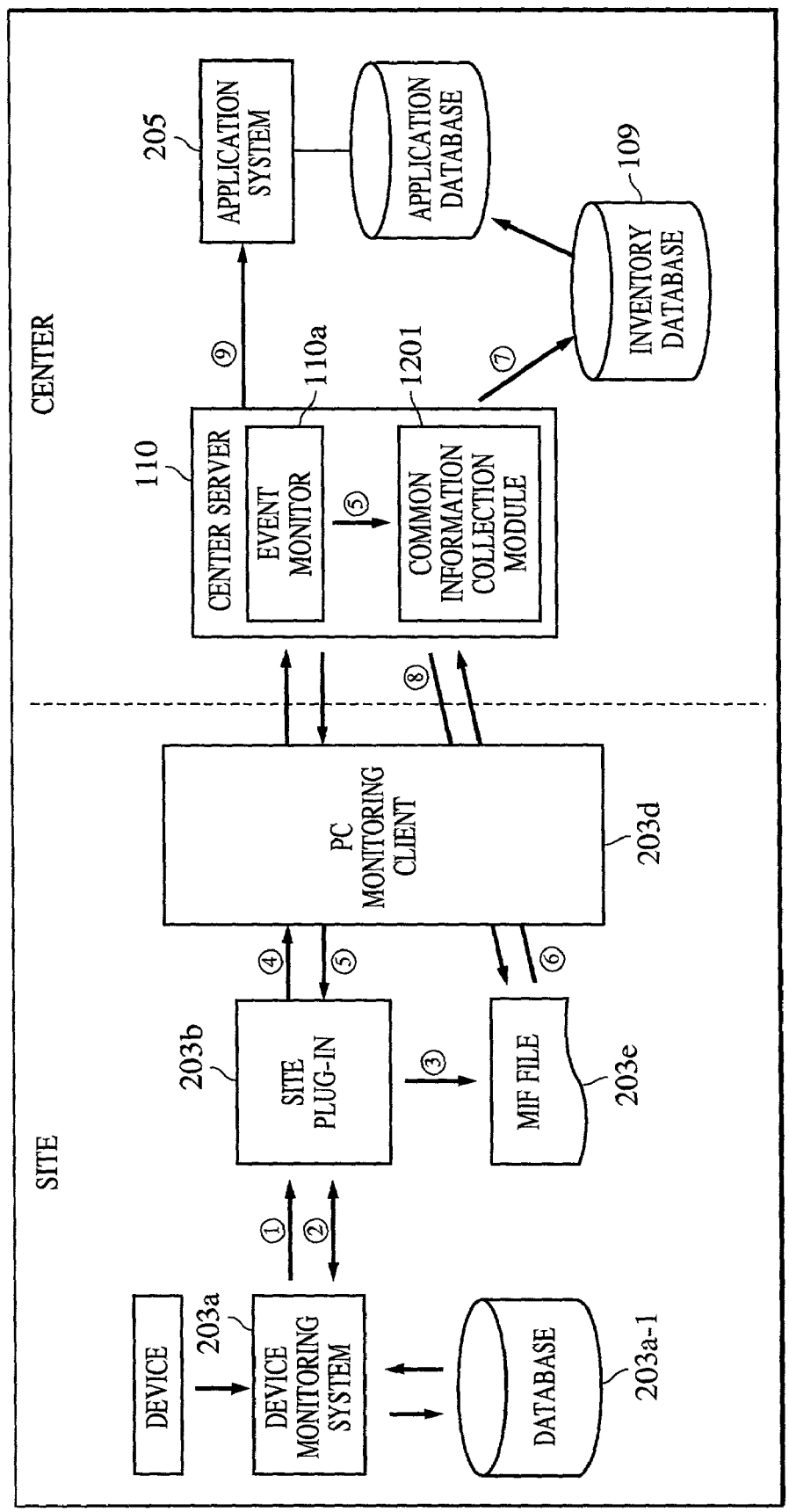
FIG. 12 is a chart for describing the procedures for uploading log data from the site system to the center system.

FIG. 12 is a chart for describing the procedures for uploading log data from the site system to the center system. With the present embodiment, the log data is uploaded as follows.

(1) The device monitoring server 203a notifies the site plug-in 203b of errors or warnings, or that the number of times thereof has exceeded a threshold.

(2) The device monitoring server 203a issues event data of the above warning to the site plug-in 203d.

(3) The site plug-in 203b stores the log data as an MIF format file 203e. As described above, the MIF format is a general file data format for information managing systems.

(4) The site plug-in 203b creates an event to the effect that an MIF file has been created, and transmits this to the center server 110.

(5) The center server 110 receives the event, and activates the shared information collecting module 1201.

(6) The shared information collecting module 1201 causes the MIF file 203e created by the site plug-in 203b to be read in, and reads the log file.

(7) The shared information collecting module 1201 stores the obtained device information in the inventory database 109.

(8) The center server deletes the site side MIF file 203e.

(9) A completion notification is transmitted to the application 205.

Thus, a log data file created by the device monitoring server 203a can be obtained at the center server 110.

<Processing Procedures by the Device Center Server>

Figure 13:
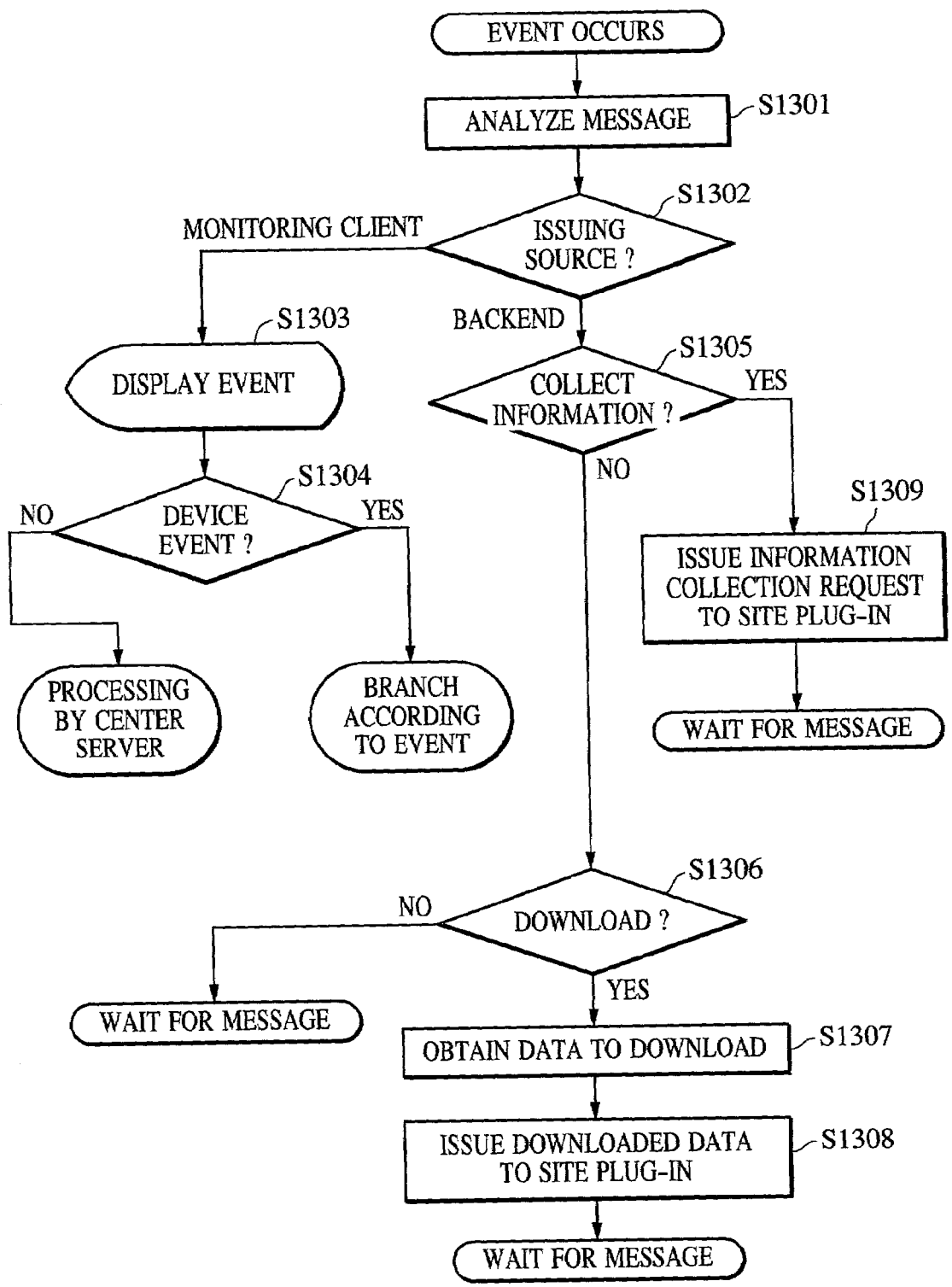
FIG. 13 is a flowchart illustrating the processing procedures at the center server 110 at the time of receiving an event.

Next, the processing procedures by the center server 110, device information processing module 901, site plug-in 203b, and PC monitoring client 203d, will be briefly illustrated. FIG. 13 is a flowchart illustrating the processing procedures at the center server 110 at the time of receiving an event. Reception of an event starts the processing shown in FIG. 13. Note that in the following description, the terms "message" and "event" are interchangeable. The term "event" is also used to mean a message which makes notification of an event occurring.

First, the received event is analyzed (step S1301), and the originator is determined (step S1302). In the case that the originator is the PC monitoring client 203d, this is processed by the event monitor, and in the case that this is a trouble event (a failure event or an error event), it is displayed in the event list (step S1303).

Figure 14:
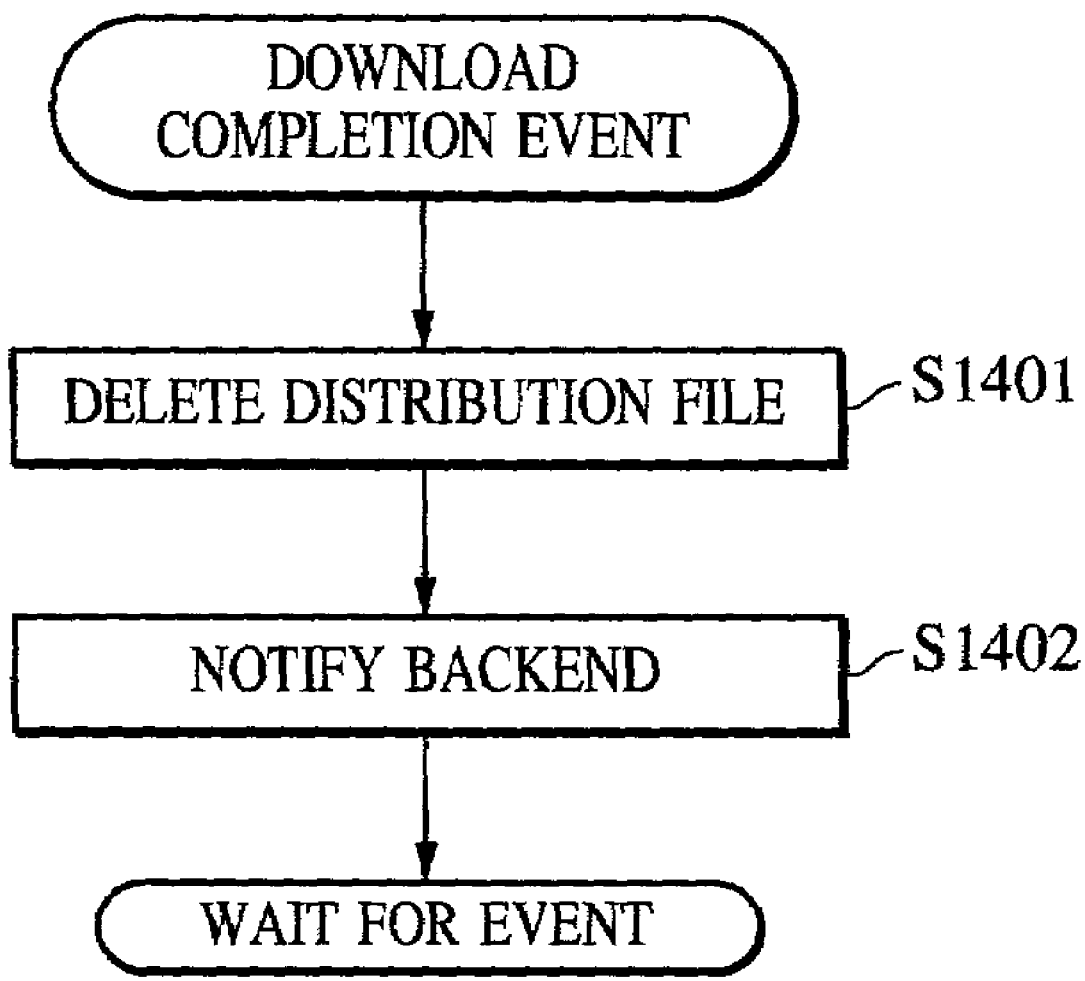
FIG. 14 is a flowchart illustrating the processing procedures of a device information processing module 901 with regard to a download end event.
Figure 15:
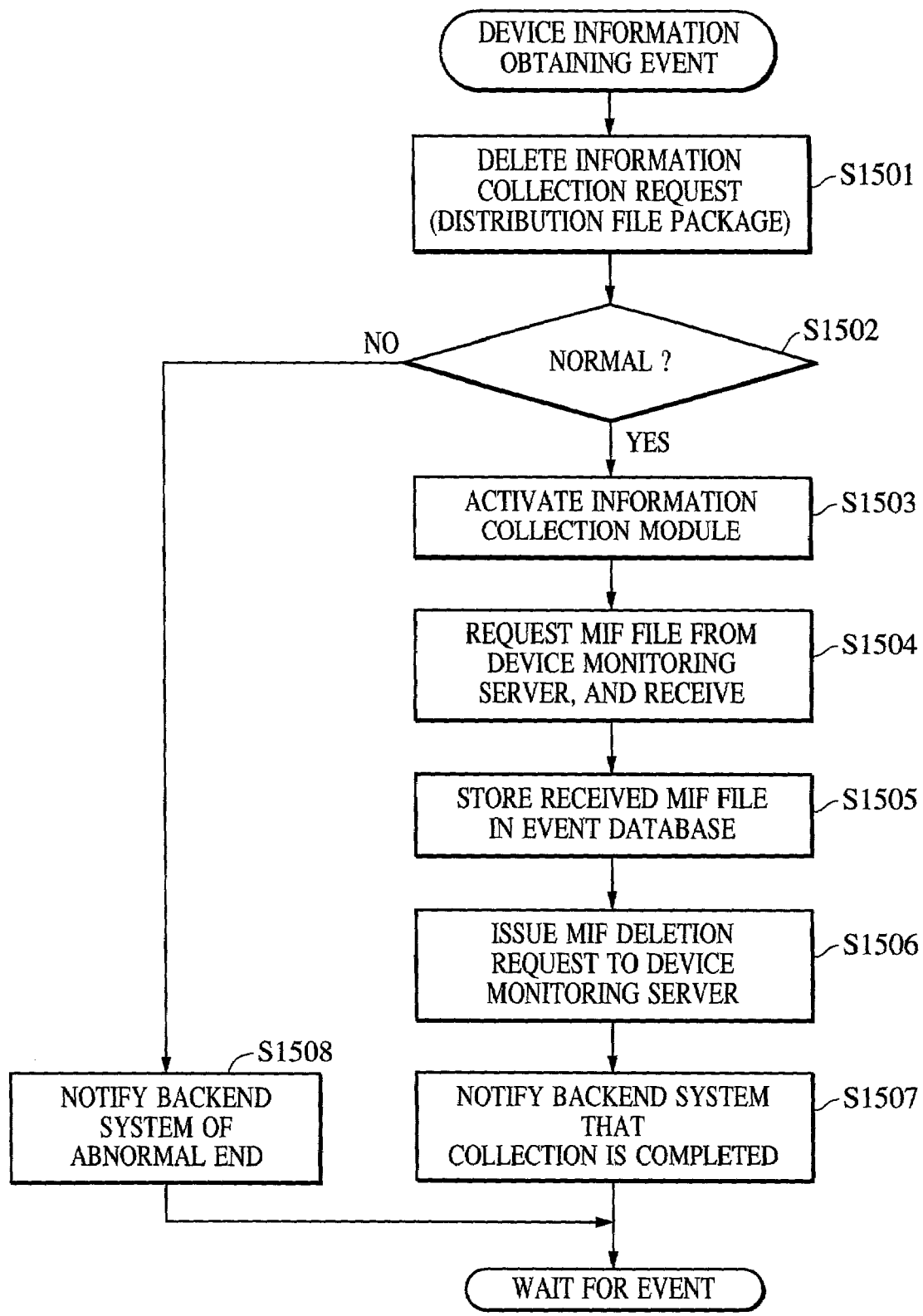
FIG. 15 is a flowchart illustrating the processing procedures of the device information processing module 901 with regard to notification of obtaining of device information (counter upload)
Figure 16:
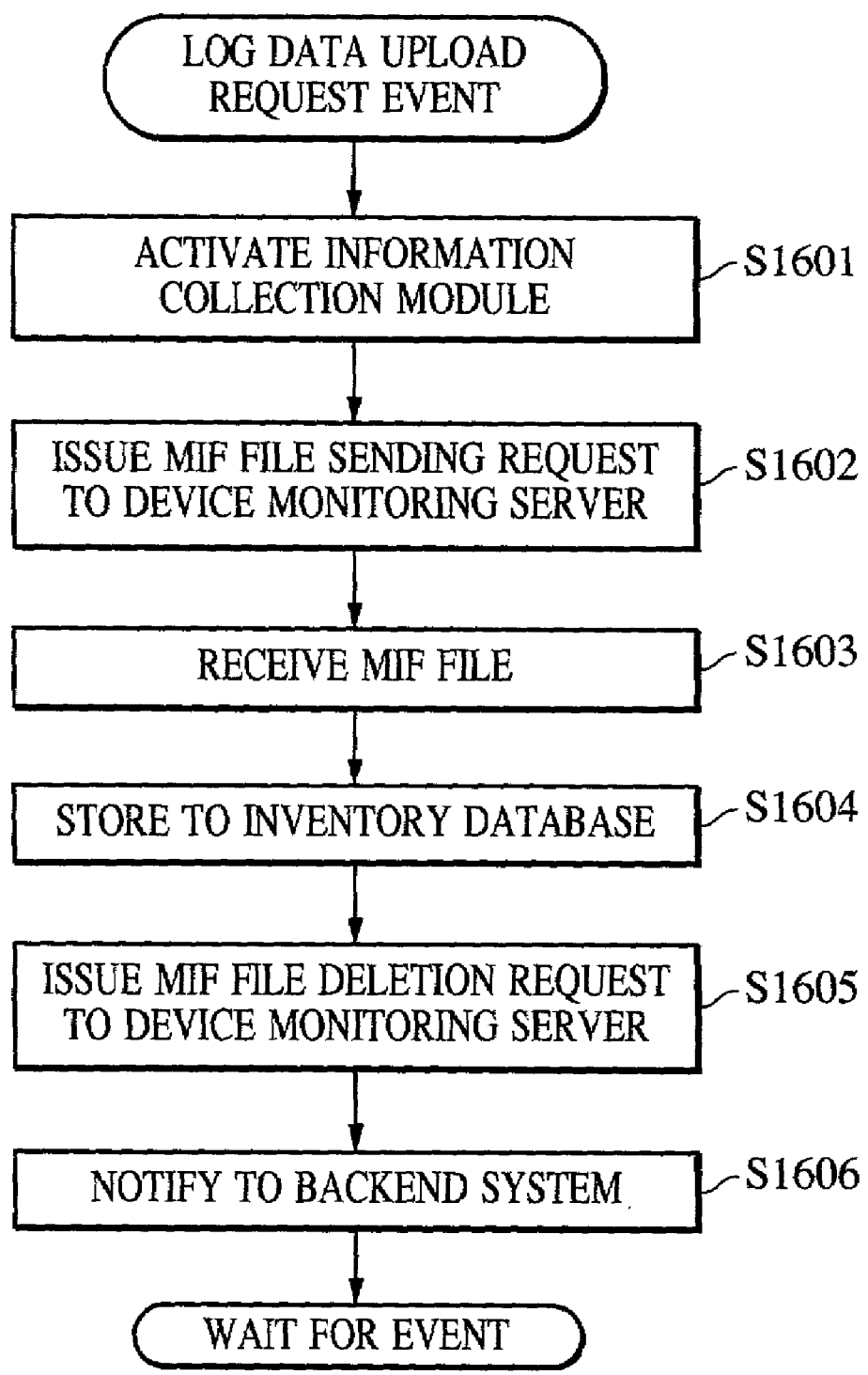
FIG. 16 is a flowchart illustrating the processing procedures of the device information processing module 901 with regard to notification of uploading log data.

Subsequently, judgment is made regarding whether or not the event is device-related, i.e., whether or not the event has been issued from the site plug-in 203b (step S1304), and in the case that the event is device-related, processing is performed by the device information processing module depending on the event. The procedures thereof are illustrated in FIGS. 14 through 16. In the case that the event is not device-related, processing according to the event is performed by the center server 110.

On the other hand, in the case that the originator of the event is the back-end, i.e., the application system, judgment is made regarding whether the event is for performing information collection (step S1305), and where this is the case, an information collection request is issued to the site plug-in module 203b (step S1309). The information collection request creates a distribution file package at the distribution module 1001 for executing the request, which is distributed and executed.

In the case that this is not an information collection request, judgment is made regarding whether this is an event for requesting downloading (step S1306). In the case where the event is not for downloading, processing according to the event is carried out, and the flow stands by for the next event.

In the case of a download request, data to be downloaded is obtained from the back-end (step S1307), and the downloaded data is distributed to the site plug-in 203b (step S1308).

<Processing Procedures by the Device Information Processing Module>

An event determined to be a device-related event in step S1304 in FIG. 13 is further broken down, and branches into the following three types of processing: (1) an event for notifying that downloading has ended; (2) an event for ending device information collection; and (3) an event for requesting a log data upload. The processing thereof is depicted in the flowcharts in FIGS. 14 through 16, respectively.

(Downloading Ended)

FIG. 14 is a flowchart illustrating the processing procedures for a downloading end event by the device information processing module 901. Upon ending of downloading being notified, first, the distribution file package 1101a is deleted (step S1401), and the back-end is notified that downloading has ended (step S1402). (Obtaining device information).

FIG. 15 is a flowchart illustrating the processing procedures of notification of obtaining device information (i.e., a counter upload) by the device information processing module 901.

First, the distribution file package 1001a created for an information collecting request is deleted (step S1501). Next, in the case that data has been normally obtained, the information collecting module 1101 is activated (step S1503), the MIF file where the device information is stored is requested from the device monitoring server 203a, and a MIF file which is the response thereto is received (step S1504).

The received file is stored in the inventory database 109 (step S1505), and a request is made to the device monitoring server 203a to delete the MIF file (step S1506). Finally, notification is made to the back-end that device information collection has ended (step S1507).

On the other hand, in the case that judgment is made in step S1502 that the data obtaining is abnormal, the back-end is notified to that effect (step S1508).

Thus, the device information created as an MIF file is obtained from the device monitoring server 203a.

(Uploading Log Data)

FIG. 16 is a flowchart illustrating the processing procedures for notifying uploading of log data by the device information processing module 901.

Once a notification for uploading log data is received, the shared information processing module 1201 is activated (step S1601), and an MIF file sending request containing log data is issued to the device monitoring module 203a (step S1602).

The MIF file, which is the response to the request, is received (step S1603), and this is stored in the inventory database 109 (step S1604). A MIF file deletion request is issued to the device monitoring server 203a (step S1605), and upon that process ending, the back-end is notified to the effect that processing has ended (step S1606).

<Processing Procedures by the Device Monitoring Server>

Figure 17:
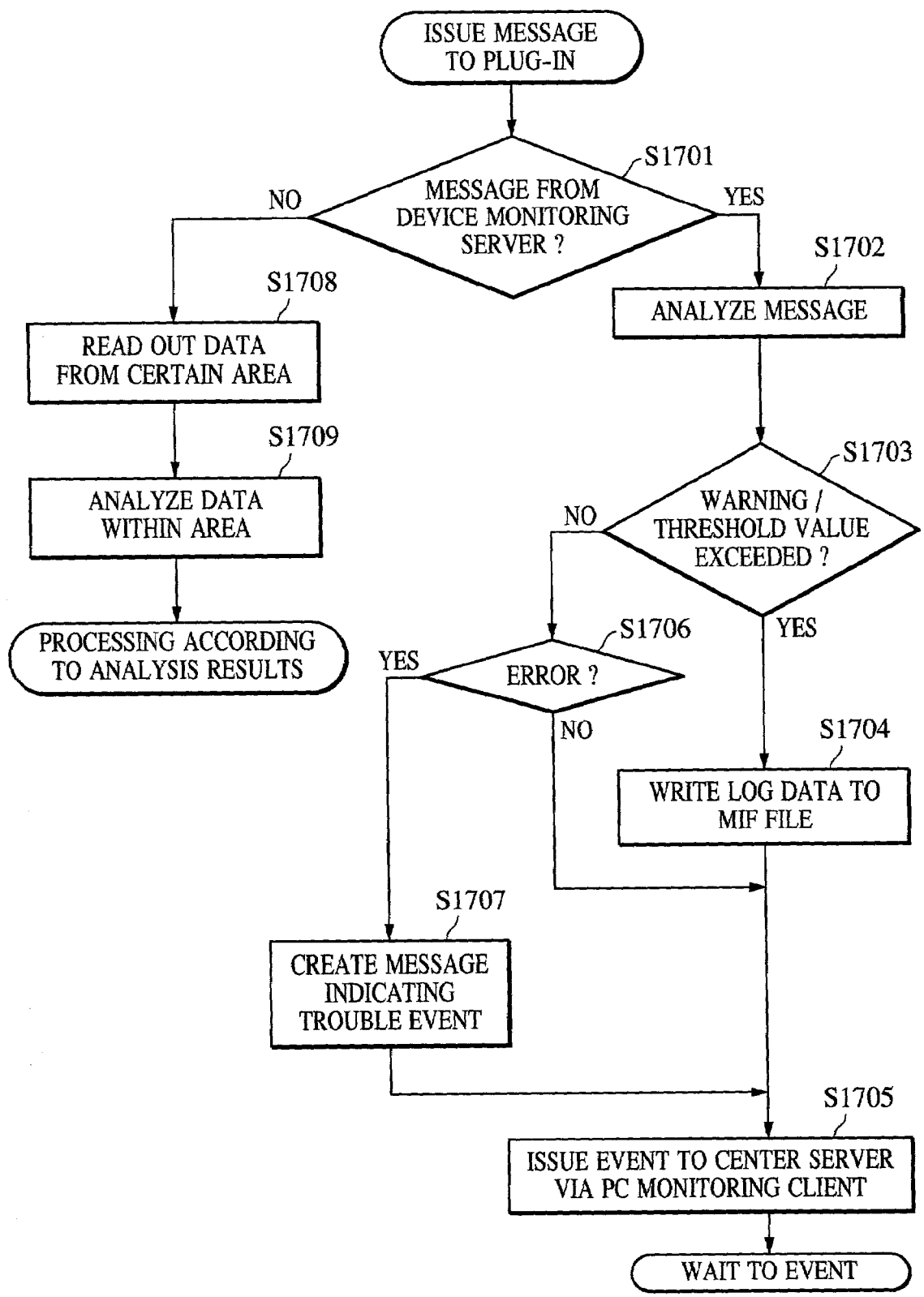

FIG. 17 is a flowchart illustrating the processing procedures for a message or event issued to the plug-in at the site plug-in 203b. Note that messages issued to the site plug-in 203b from the center server 110 are stored in a predetermined area by the monitoring client 203d, so the site plug-in 203b continues to continuously or periodically monitor this.

In the case that there is a message, judgment is made regarding whether or not it is a message from the device monitor server 203a (step S1701), and if this is the case, the message is analyzed (step S1702), and where the message is a warning or a threshold exceeded, the log data is written as an MIF file, and an event is issued to the center server 110 to the effect that the log file will be uploaded, via the PC monitoring client 203d (step S1705). In the case where the message is not a warning or a threshold exceeded, judgment is made regarding whether or not this is an error (step S1706), and in the case that this is an error, a message indicating a trouble event is created (step S1707), and the flow branches to step S1705.

In the case that this is not a message from the device monitoring server 203a (NO in step S1701), judgment is made that this is a message from the center server 110, the predetermined area written by the PC monitoring client 203d is read (step S1708), the data thereof is analyzed (step S1709), and processing according to the contents thereof is executed. The details of the processing according to the analyzed contents is shown in FIG. 18.

Figure 18:
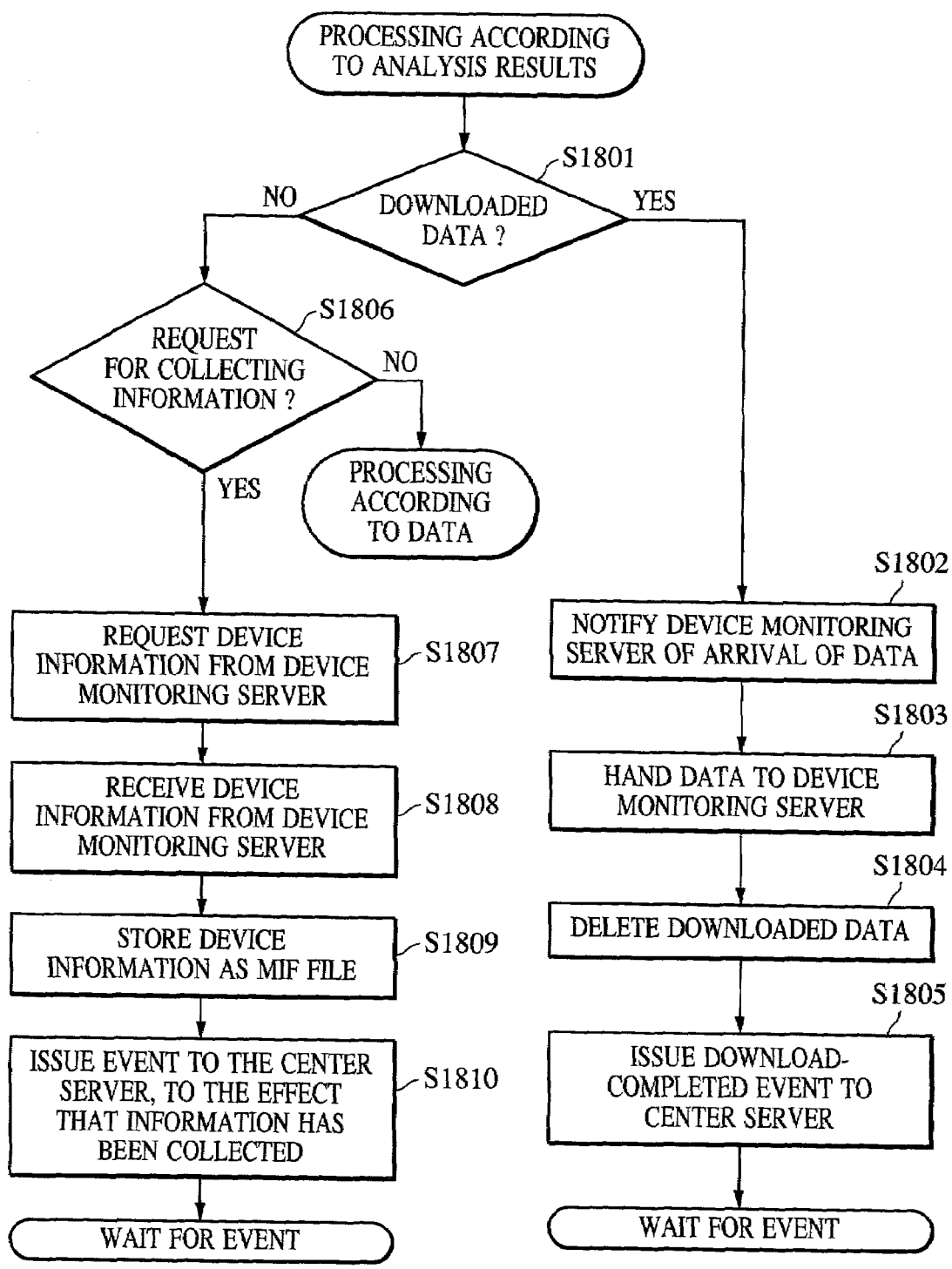
FIG. 18 is a flowchart illustrating the procedures of processing of the site plug-in 203b according to maintaining a message received from a center server 1101.

FIG. 18 is a flowchart illustrating the processing of procedures according to the message received from the center server 110, by the site plug-in 203b.

First, judgment is made regarding whether or not this is downloaded data (step S1801), and in the case that this is downloaded data, notification of reception of the downloaded data is made to the device monitoring server 203a (step S1802), and the data is handed over (step S1803). The data that has been handed over is deleted (step S1804), and a download completed event is issued to the center server (step S1805).

In the case that this is not downloaded data, judgment is made regarding whether or not this is a device information collection request (step S1806), and in the case that it is, a device information collection request is made to the device monitoring server 203a (step S1807).

In the case that device information is received from the device monitoring server 203a in response thereto (step S1808), this is stored as a MIF file (step S1809), and a message to the effect that device information has been collected is issued to the center server 110.

<Processing Procedures by PC Monitoring Client>

Figure 19:
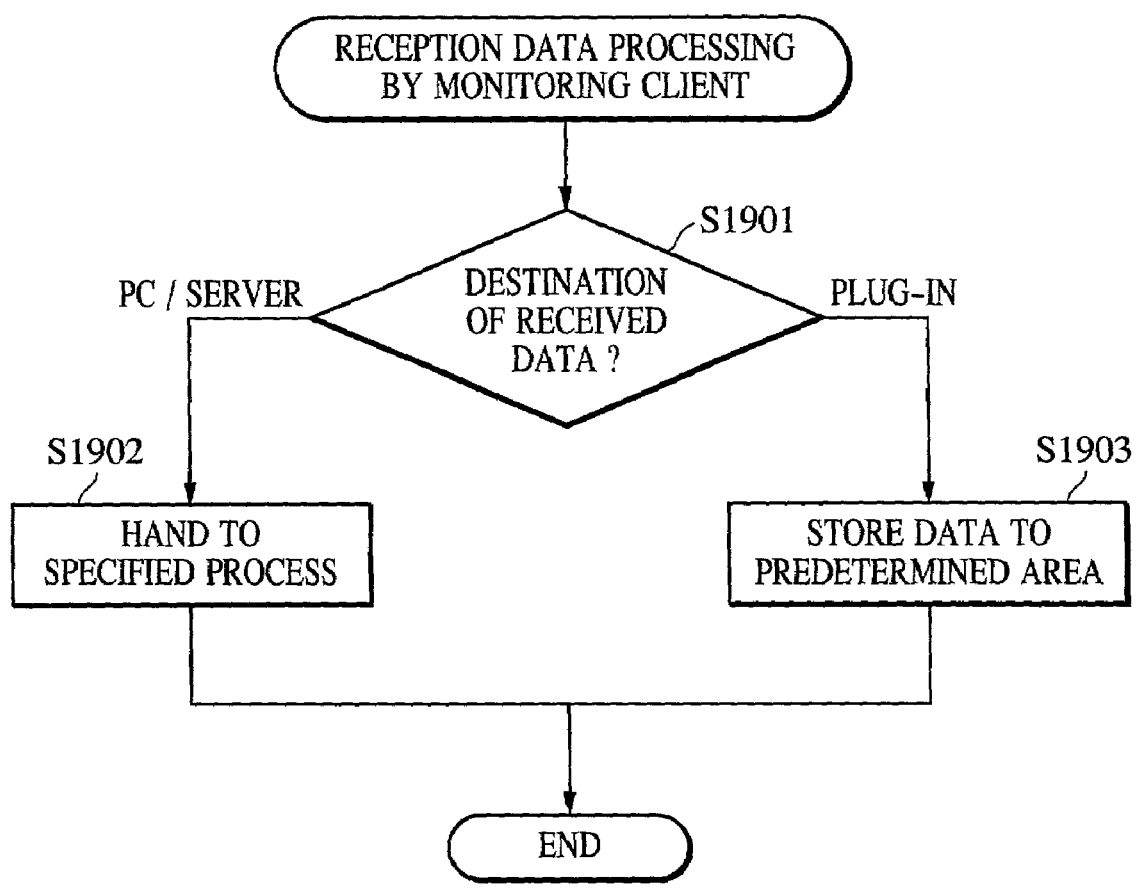
FIG. 19 is a flowchart illustrating the processing procedures in the event that a PC monitoring client has received a message.

FIG. 19 is a flowchart illustrating the processing procedures in the event that the PC monitoring client receives a message.

In FIG. 19, judgment is made where the destination of the received data is (step S1901), and in the case that the data is addressed to a general-purpose computer such as a PC/server, the data is handed over to the specified process (step S1902), and in the case that this is a site plug-in, the data is written to the aforementioned predetermined area (step S1903).

Thus, with the system according to the present embodiment, peripheral equipment installed in the same managed site as the general-purpose computers, which are being monitored, can also be managed, using a general-purpose computer monitoring system. Accordingly, the general-purpose computers and peripheral equipment can be centrally monitored at the managing site in the same manner. Further, collection of information relating to the peripheral equipment, parameter settings, etc., can be performed from the managing site side via the monitoring system. Also, log transmission can be made from the managed site side to the managing site.

Further, modules to be added to the general-purpose computer monitoring system for managing the peripheral equipment can all be realized by software, so there is no hardware required for this purpose, thereby suppressing increased footprint and costs of equipment, maintenance work, and other such increases related to hardware.

Also, the present invention is not restricted to matching device managing information to general-purpose computer (PC/server) managing software; rather, the reverse can be true, i.e., PC/server managing information may be made to match peripheral equipment (devices) managing software. For example, configurations may be conceived wherein the devices 201 and the PC/servers 202 shown in FIG. 9, and the device monitoring server 203a and the PC monitoring client module 203d are respectively exchanged, with the MIF file 203e being of a file format unique to the device, the site plug-in 203b being provided with functions for converting the PC/server format into a device format, the center server processing the deices, the device processing module 901 processing the PC/server information and issuing an event to the device center, and so on.

<Center Call>

Description will be made regarding the application system used at the managing site in the event that a customer of a managed site telephones the managing site, with regard to the first remote site managing system or the second remote site managing system, described above. With the remote site managing system described above, in the event that trouble or failure occurs in equipment in the office, notification to that effect is normally transmitted from the device monitoring server 203*a* to the device center server. However, there are other cases wherein, in the event that a customer in a managed site detects trouble but is not able to specifically determine what the trouble is, the customer will directly notify the managing site by telephone (i.e., place a center call). In this case, the staff in the managing site must respond to the customer or the trouble in an appropriate manner, and this application system (center call application system) is used to this end.

<Center Call Application System>

Figure 20:
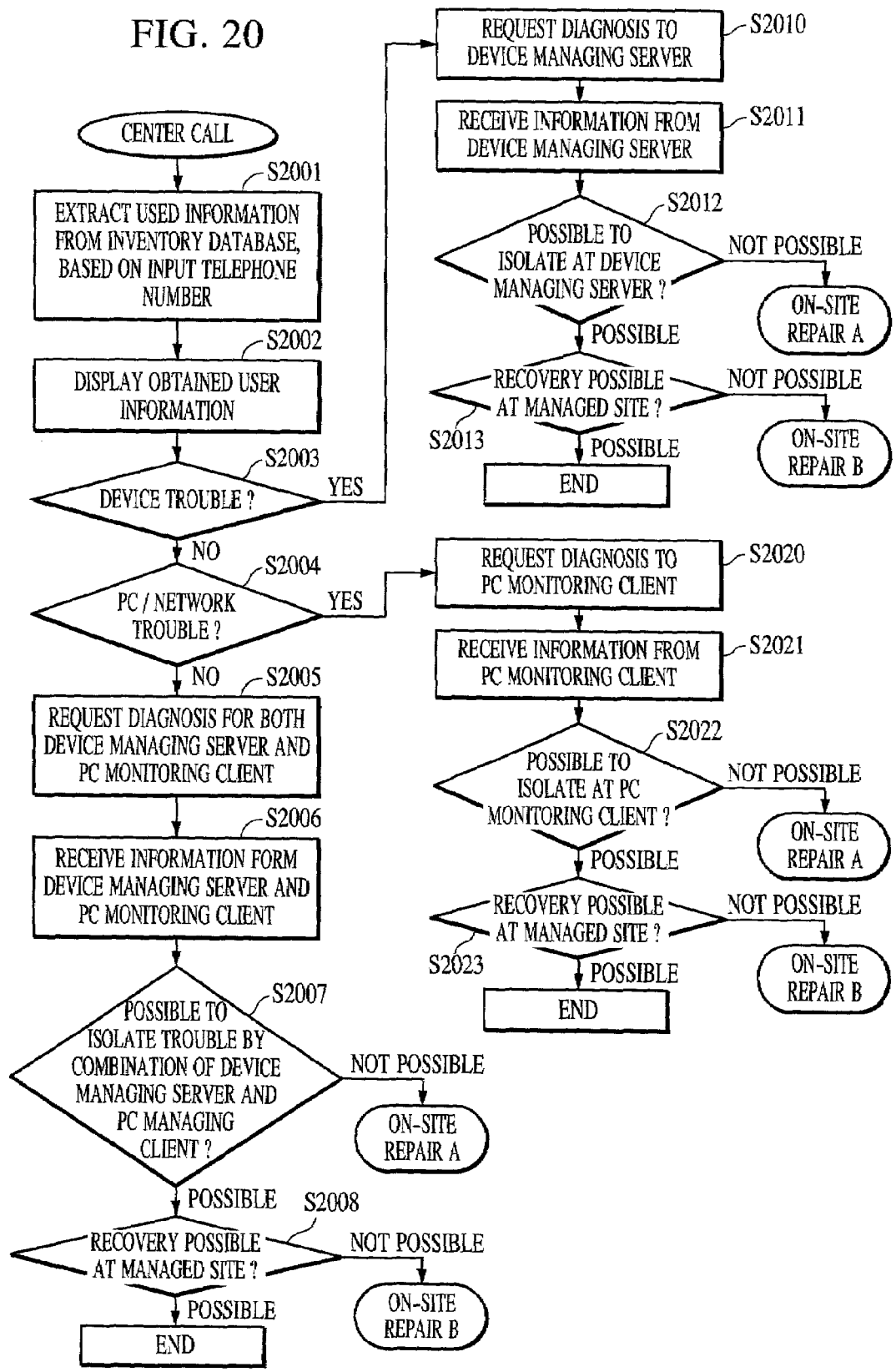
FIG. 20 is a flowchart illustrating the processing which a center call application system performs.
Figure 21:
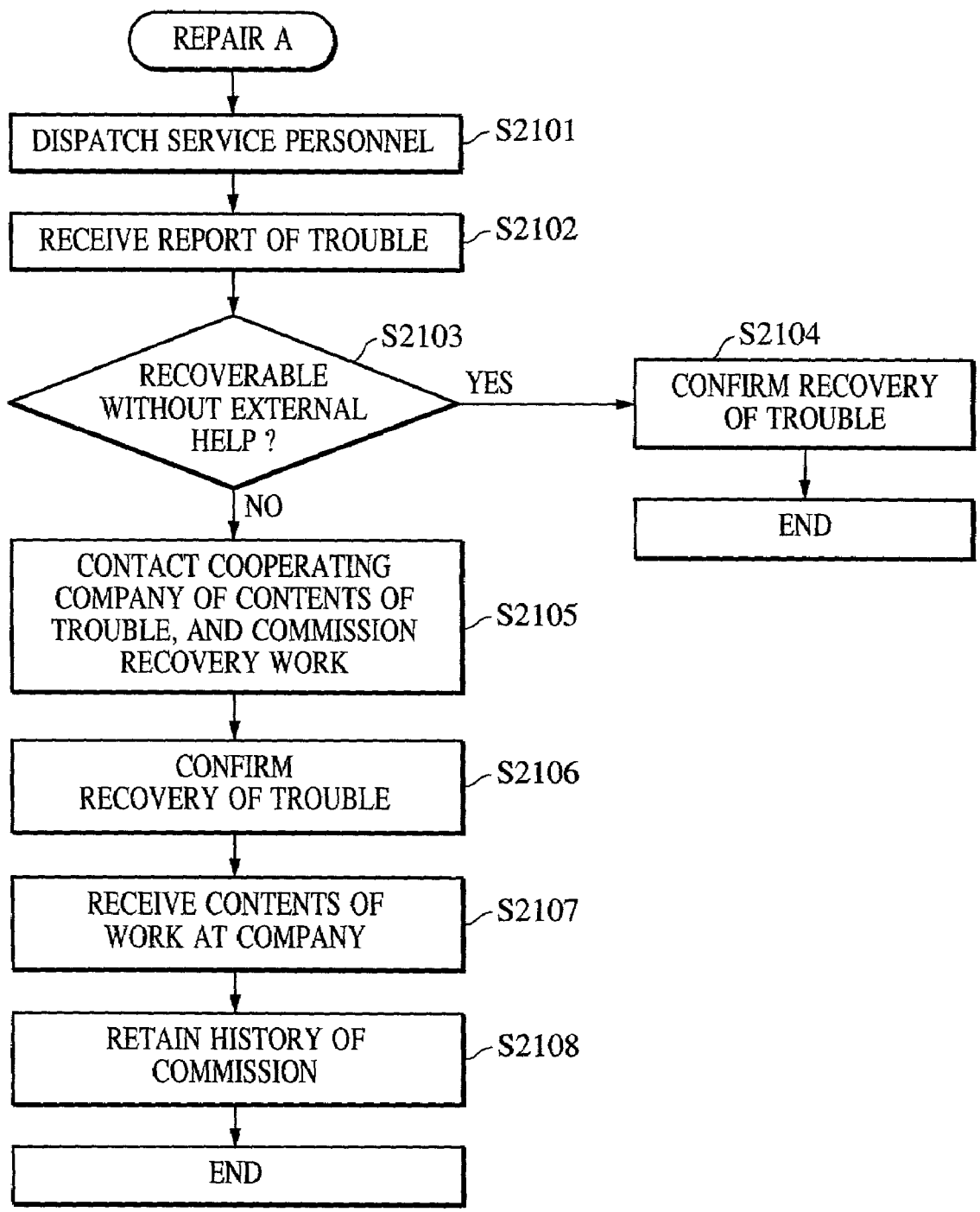
FIG. 21 is a flowchart illustrating the processing in the event that a center call application system carries out repair A.
Figure 22:
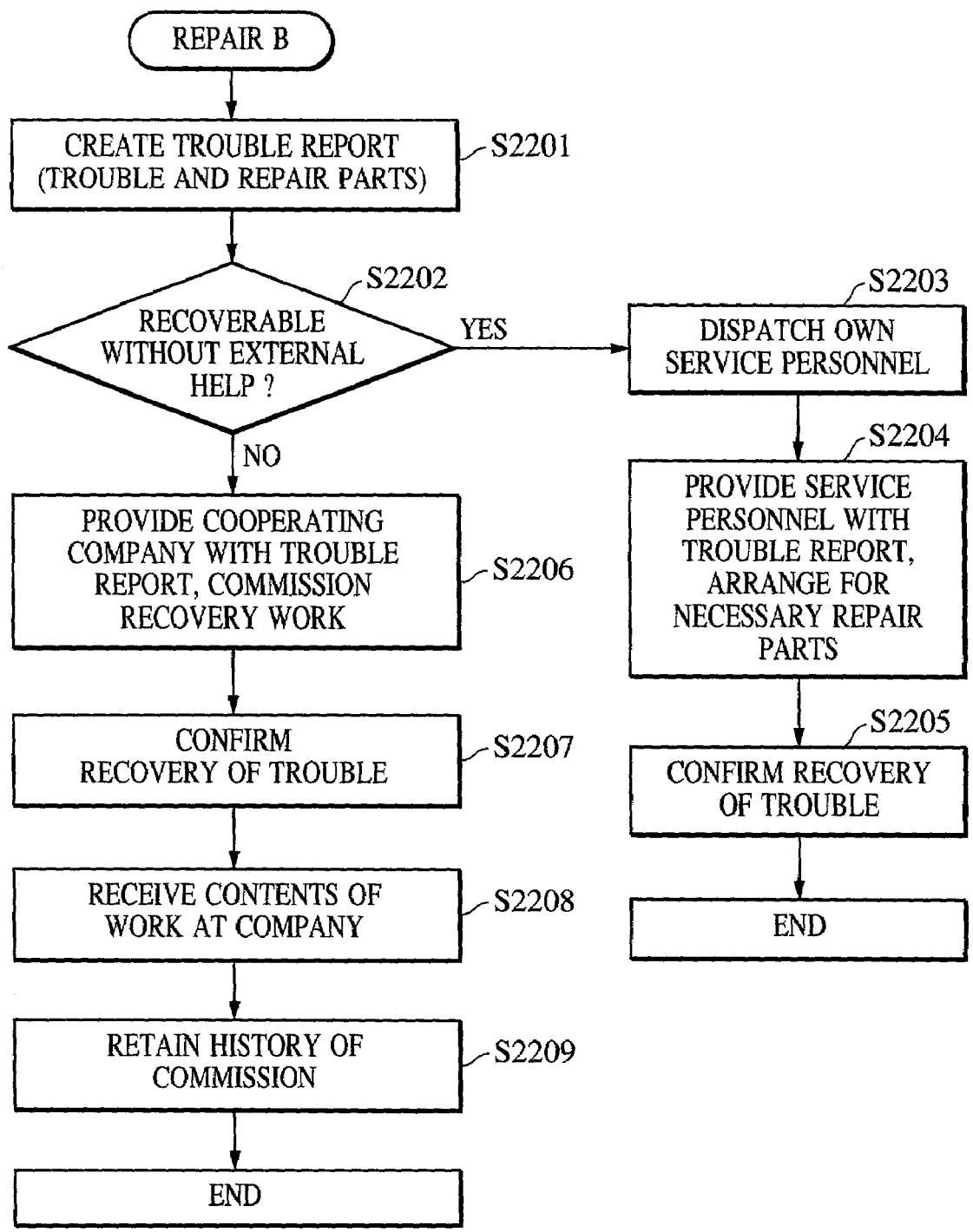
FIG. 22 is a flowchart illustrating the processing in the event that a center call application system carries out repair B.

FIGS. 20 through 22 are flowcharts illustrating the processing which the center call application system performs. First, an input screen for the staff to input the telephone number of the customer is displayed, and the flow waits for input of the telephone number. Once the telephone number is input (a center call is initiated), the telephone number is used as a key to obtain user information from the inventory database 109 (step S2001). This user information is then displayed on the display screen (step S2002).

Figure 23:
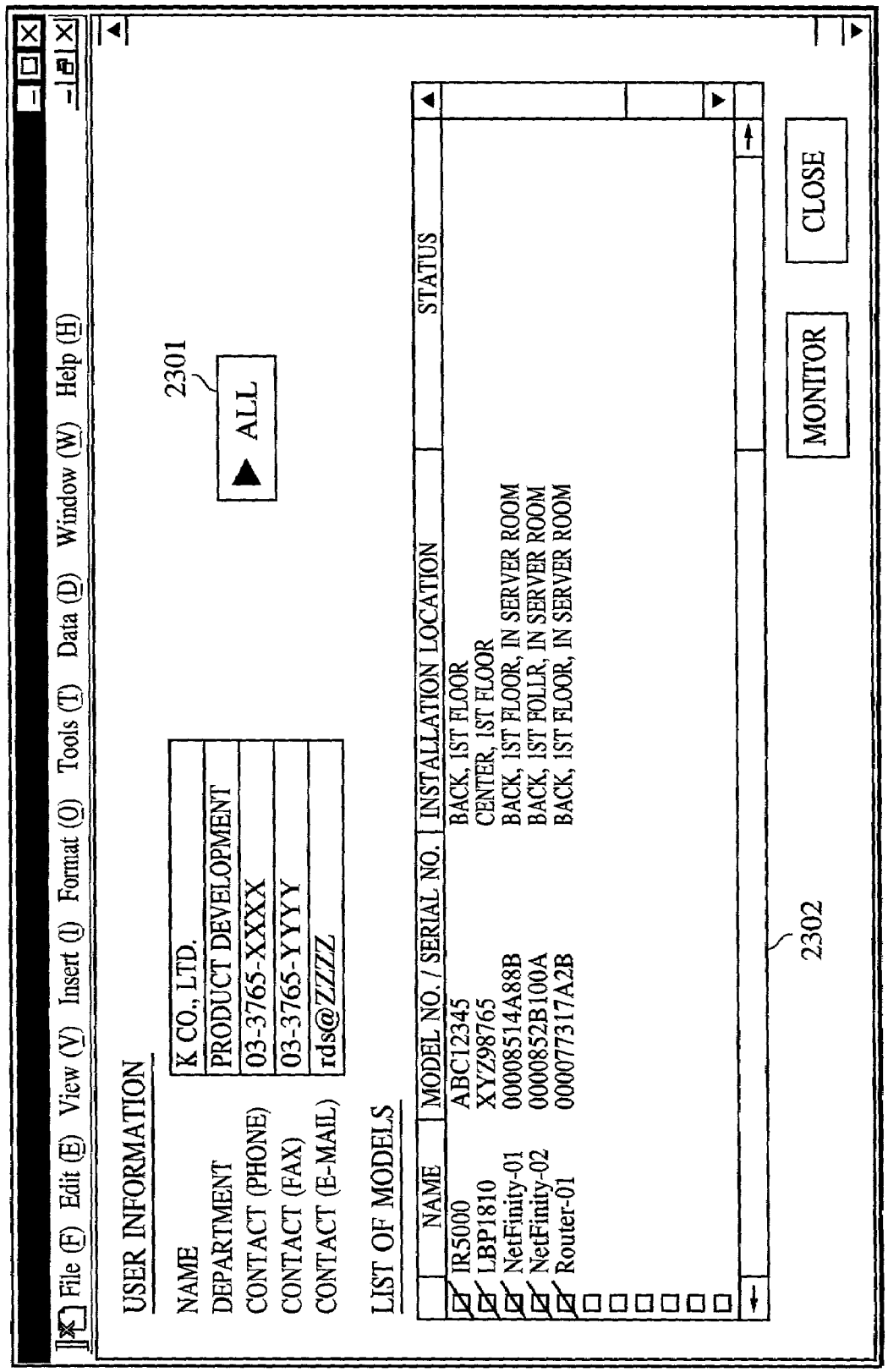
FIG. 23 is a diagram illustrating an example of a user display screen.

FIG. 23 is a diagram illustrating an example of a user display screen. In this screen, the name, department, and telephone number of the customer are displayed. Also, the equipment list 2302 lists the devices installed at the customer site. In this figure, "ALL" is selected with the selection button 2301, so all device equipment and PC/server equipment are displayed. However, selecting a "DEVICE" option with button 230 displays only the device equipment, and selecting a "PC" option with button 2301 displays only the PC equipment.

Accordingly, in the event that the staff judges that device-related trouble is occurring, based on the information from the customer, the staff selects "DEVICE". Also, in the event that the staff judges that PC/network-related trouble is occurring, the staff selects "PC". In the event that the staff cannot judge either way, the staff selects "ALL".

The center call application system judges whether the user has selected "DEVICE", "PC", or "ALL". First, judgment is made regarding whether or not device-related trouble has occurred, based on whether or not "DEVICE" has been selected by the selection button 2301 (step S2003). In the event that judgment is made that device-related trouble has occurred, the flow proceeds to step S2010, otherwise, the flow proceeds to step S2004, where judgment is made regarding whether or not PC/network-related trouble has occurred, based on whether or not "PC" has been selected by the selection button 2301 (step S2004). In the case that judgment is made that PC/network-related trouble has occurred, the flow proceeds to step S2020. Otherwise, the flow proceeds to step S2005.

<Device-Related Trouble>

In the case that judgment is made in step S2003 that device-related trouble is occurring, the flow proceeds to step S2010, and a request is issued for the device monitoring server to perform diagnosis (step S2010). Specifically, a message instructing information collection is transmitted to the device center server. In response, the device center server issues an information collecting request to the device monitor server, with the processing shown in FIG. 5. Next, information from the device monitoring server is received via the device center server (step S2011).

Judgment is made regarding whether or not the contents of the trouble can be isolated by the device monitoring server (step S2012). A case wherein this can be isolated is a case wherein the trouble can be detected by the device monitoring server (e.g., a case wherein a trouble event is contained in the received information), or the like. In the case that this cannot be isolated, Repair A (FIG. 21) is carried out.

Figure 24:
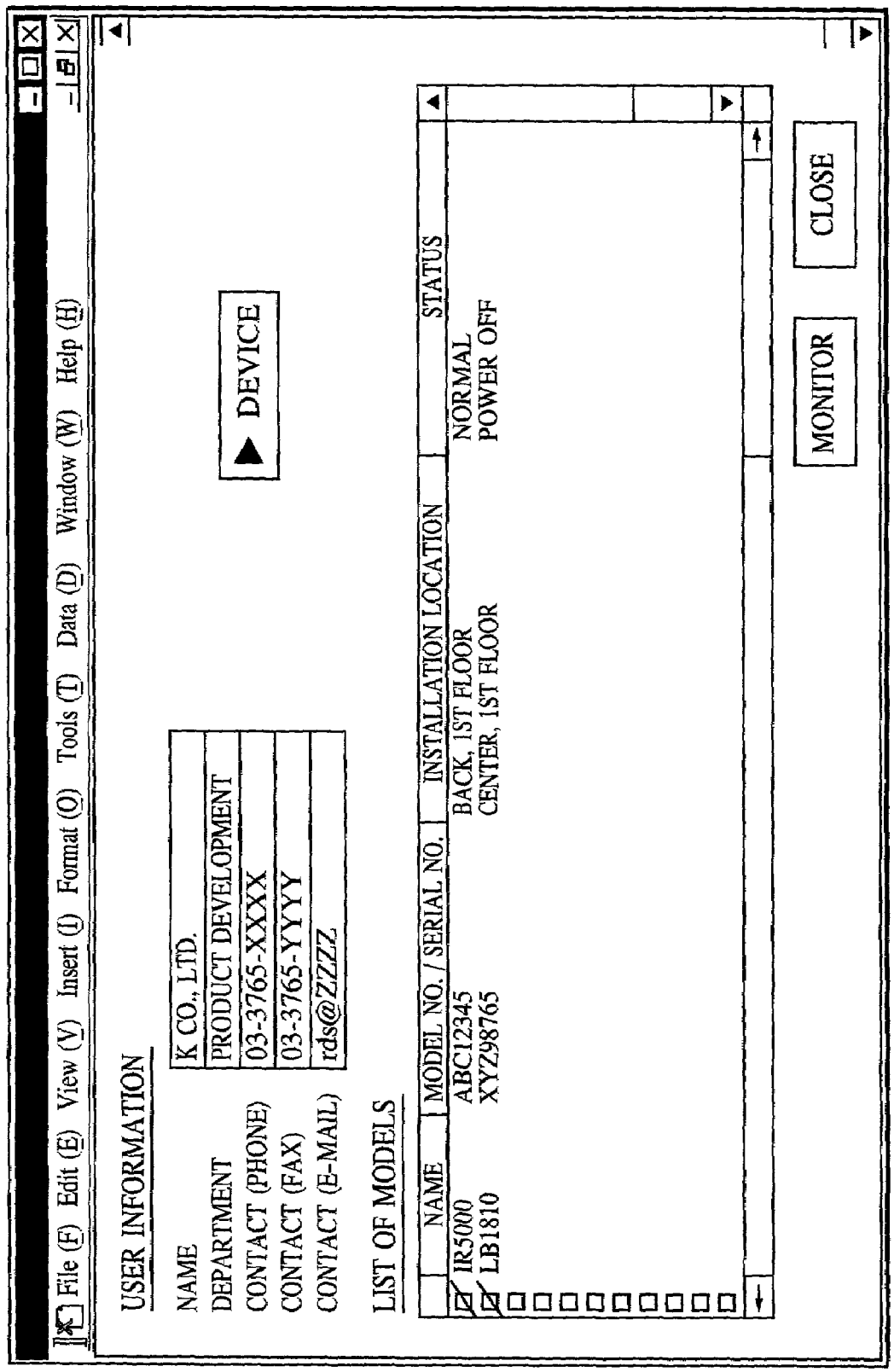
FIG. 24 is a diagram illustrating an example of a display screen indicating recovery.

In the case that the trouble can be isolated, further judgment is made regarding whether or not the trouble can be recovered from at the managed site (step S2013). In the case that recovery from at the managed site is impossible, Repair B (FIG. 22) is performed. In the case that recovery can be made, the contents of the trouble is displayed so as to be comprehended by the staff. For example, with the display screen in FIG. 24, a display is blinking, indicating that the power of the laser beam printer "LB1810" is off. The staff, upon viewing this display, advises the customer regarding what to do.

<PC/Network-Related Trouble>

In the case that judgment is made in step S2004 that PC/network-related trouble is occurring, the flow proceeds to step S2020, and a request is issued for the PC monitoring client to perform diagnosis (step S2020). Specifically, a message instructing information collection is transmitted to the center server. In response, the center server issues an information collecting request to the PC monitoring client. Next, information from the PC monitoring client is received via the center server (step S2021).

Judgment is made regarding whether or not the contents of the trouble can be isolated by the PC monitoring client (step S2022). A case wherein this can be isolated is a case wherein the trouble can be detected by the PC monitoring client (e.g., a case wherein a trouble event is contained in the received information), or the like. In the case that this cannot be isolated, Repair A (FIG. 21) is carried out.

Figure 25:
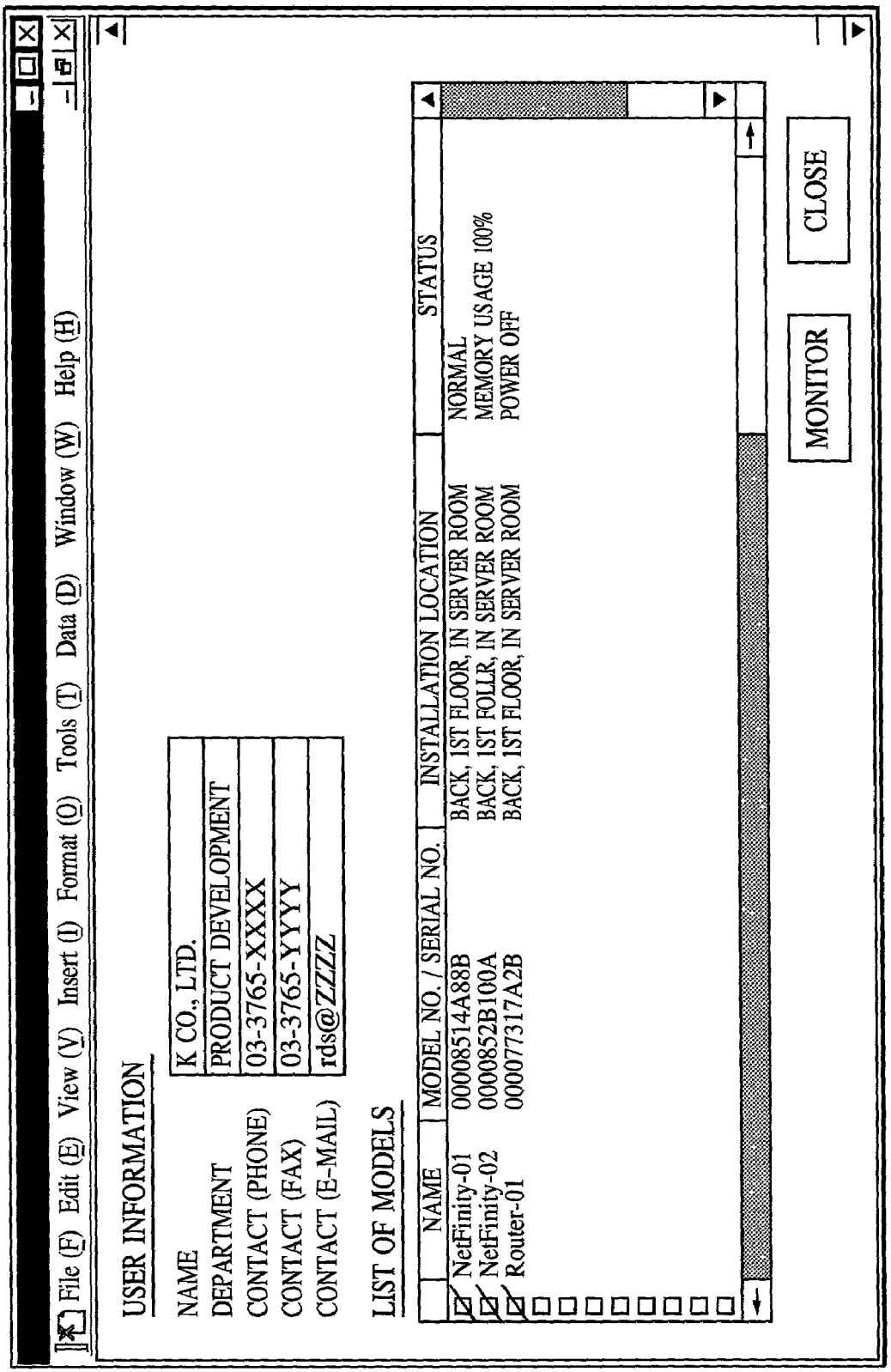
FIG. 25 is a diagram illustrating an example of a display screen indicating recovery.

In the case that the trouble can be isolated, further judgment is made regarding whether or not the trouble can be recovered at the managed site (step S2023). In the case that recovery at the managed site is impossible, Repair B (FIG. 22) is performed. In the case that recovery can be made, the contents of the trouble are displayed so as to be comprehended by the staff. For example, with the display screen in FIG. 25, a display is blinking, indicating that the power of the network router "Router-01" is off. The staff, upon viewing this display, advises the customer regarding what to do.

<Judgment of Device-Related or PC/Network-Related Trouble>

In the case that judgment could not be made in step S2003 and step S2004 whether the trouble is device-related or PC/network-related trouble, specifically, in the case that the staff has selected "ALL" with the selection button 2301, a request is issued to both the PC monitoring client and the device monitoring server to perform diagnosis (step S2005). Specifically, a message instructing information collection is transmitted to the device center server and the center server. In response, the center server issues an information collecting request to the PC monitoring client. Also, the device center server issues an information collecting request to the device monitoring server. Next, information from the device monitoring server and the PC monitoring client is received via the device center server and the center server (step S2006).

Judgment is made regarding whether or not the contents of the trouble can be isolated by the combination of the device monitoring server and the PC monitoring client (step S2007). A case wherein this can be isolated is a case wherein the trouble can be detected by the device monitoring server and the PC monitoring client (e.g., a case wherein a trouble event is contained in the received information), or the like. In the case that this cannot be isolated, Repair A (FIG. 21) is carried out.

In the case that the trouble can be isolated, further judgment is made regarding whether or not the trouble can be recovered at the managed site (step S2008). In the case that recovery at the managed site is impossible, Repair B (FIG. 22) is performed. In the case that recovery can be made, the contents of the trouble are displayed so as to be comprehended by the staff. The staff, upon viewing this display, advises the customer regarding what to do.

FIG. 26 gives examples of cases wherein isolation can be made in the judgment in step S2007. The call contents are the contents which the staff was informed of by the customer over the telephone. The monitoring results are the contents of the information sent from the PC monitoring client and the device monitoring server.

In the first case, the PC 1 gave an instruction to the printer 1 to print, but printing processing was not performed. The results of diagnosis by the PC monitoring client and the device monitoring server indicated that the PC 1 and the printer 1 were normal, but that the available capacity on the hard disk of the PC serving as the printer server had decreased to 200 Kbytes. Accordingly, judgment was made that the available capacity on the hard disk of the print server was low and the printing data could not be stored (spooled) properly, and that available capacity on the hard disk of the print server should be secured as a countermeasure.

In the second case, a new PC 2 was set up and printer settings were set. The printer 2 can be recognized from the PC 2, but not the printer 3. The results of diagnosis by the PC monitoring client and the device monitoring server indicated that the router 1, printer 2, and printer 3 were normal, but that there was no response from the PC 2. Accordingly, judgment was made that the default gateway settings were not correctly made for the new PC 2 and the new PC 2 could not cross segments for communication, and that the IP address of the router 1 should be set to the default gateway of the PC 2 as a countermeasure.

In the third case, printing instructions were given from a PC 3 to a printer 4, but printing processing was not carried out. The results of diagnosis by the PC monitoring client and the device monitoring server indicated that the PC 3 was normal, but a defective connection was detected for the sorter of the printer 4. Accordingly, judgment was made that the sorter of the printer 4 was not connected properly, and that the sorter should be properly connected as a countermeasure.

<Repair A>

FIG. 21 is a flowchart illustrating the processing for the center call application system to perform Repair A. Repair A is carried out in the case that judgment is made in steps S2012, S2022, or S2007, that isolation by the device monitoring server or PC monitoring client cannot be made.

With repair A, the contents of the trouble could not be isolated, so service personnel is dispatched to the managed site (step S2101). Specifically, dispatch information is transmitted to a portable information terminal such as a notebook PC or a cellular phone, for example, which the service personnel is carrying, displaying a display screen such as shown in FIG. 27A on the portable information terminal which the service personnel carries.

FIGS. 27A and 27B illustrate examples of a display screen displayed on the portable information terminal. Here, first, the consumer information (name and telephone number) of the location to head to is displayed (FIG. 27A). The service personnel then must input whether he/she can go to the location, and if so, how many minutes it will take to reach the location (FIG. 27B), and this information is received.

Next, the flow waits for a trouble report from the service personnel heading to the customer site, and receives the report (step S2102). The trouble report is input by the service personnel using the device monitoring server or PC monitoring client at the managed site, and is received via the device center server or center server. Judgment is made based on this trouble report whether the trouble can be handled without external help (step S2103).

In the case that the trouble can be handled without external help, the service personnel will perform the recovery work on the spot, so the flow waits for the recovery to be confirmed (step S2104). The processing ends following information received from the device monitoring server or PC monitoring client that recovery has been confirmed.

In the case that the trouble cannot be handled without external help, work is commissioned to a cooperating company (step S2105). This is for cases wherein the maintenance company mainly handles device-related equipment and the trouble which has occurred is PC-related trouble, to commission recovery work (maintenance service) to a cooperating company. Now, let us say that a commissioning sheet such as shown in FIG. 28 is sent to the cooperating company by e-mail. This commissioning sheet contains the user information, and also equipment information of the equipment with which trouble is occurring. Determination of the equipment with which trouble is occurring is carried out based on the trouble record in step S2102. In step S2105, a file serving as a template for the commissioning sheet is first read out, and user information extracted in step S2001 is filled in. Next, the equipment is determined based on the trouble contents, and device information regarding that equipment is filled in. Further, the contents of the trouble received are filled in a predetermined space as comments. The file is attached to an e-mail, and transmitted to the cooperating company.

The service personnel of the cooperating company will perform the maintenance work, so the flow waits until the work is finished and recovery is confirmed (step S2106). Further, a work report such as that shown in FIG. 29 is received from the cooperating company by e-mail (step S2107).

FIG. 29 is a diagram illustrating an example of a work report from the cooperating company which indicates the time at which the work was executed, the model name and serial No. of the device on which maintenance was performed, the cause of the trouble, and the measures taken. Also, information relating to the contents of the work report are stored in a database as commissioning history, to pay this cooperating company fees for carrying out the maintenance work (step S2108).

<Repair B>

FIG. 22 is a flowchart illustrating the processing for the center call application system to perform Repair B. Repair B is carried out in the event that judgment is made in steps S2013, S2023, or S2008, that recovery cannot be made at the managed site.

With repair B, the contents of the trouble are already known, so first, a trouble report is created based on information from the device monitoring server or PC monitoring client (step S2201). FIG. 30 is a diagram illustrating an example of a trouble report. The trouble report lists the time that the trouble occurred, the model and serial No. of the device where the trouble occurred, the cause of the trouble, and measures taken against the trouble.

Next, judgment is made regarding whether the trouble can be handled without external help (step S2202). In the case that the trouble can be handled without external help, the service personnel is sent to the managed site (step S2203). Specifically, this is the same as with step S2101 in FIG. 21. Further, a trouble report is attached to an e-mail and sent to the portable information terminal which the service personnel has, and necessary parts are arranged for (step S2204). The service personnel who has headed to the customer site performs recovery work, and the flow waits for the work to end and recovery to be confirmed (step S2205). Once recovery has been confirmed by information received from the device monitoring server or PC monitoring client, the processing ends.

In the case that the trouble cannot be handled without external help, a cooperating company is commissioned to perform the work (step S2206). Here, as with step S2105 in FIG. 21, a commissioning sheet is sent to the cooperating company by e-mail. At the same time, a trouble report is also sent to the cooperating company by e-mail. The service personnel of the cooperating company performs the recovery work, so the flow waits for this to end and recovery to be confirmed (step S2207). Further, a work report such as that shown in FIG. 29 is received from the cooperating company by e-mail (step S2208). Information relating to the contents of the work report are stored in a database as commissioning history to pay this cooperating company fees for carrying out the maintenance work (step S2209).

<Other Embodiments>

The objects of the present invention are achieved by an arrangement wherein a recording medium storing software program code for realizing the functions of the above embodiments is supplied to a system or device, and a computer (or CPU or MPU) of the system or device reads out and executes the program code stored in the recording medium.

In this case, the program code read out from the recording medium itself realizes the new functions of the present invention, and the recording medium storing the program code comprises the present invention.

The device information data may be held in a hard disk built into an image processing device and image data rendering device, and externally connected recording medium, a server accessible from the image data rendering device, or the like. Further, an arrangement may be made wherein device information data can be arbitrarily set by the user.

Examples of storing mediums which can be used for supplying the program code include floppy disks, hard disks, optical disks, magneto-optical disks, CD-ROMs, CD-Rs, DVD-ROMs, magnetic tape, non-volatile memory cards, ROM, and so forth.

Also, the present invention encompasses cases not only where the computer executing the read program code realizes the functions of the above embodiments, but also wherein an operating system or the like running on the computer performs part or all of the actual processing based on the instructions of the program code, thereby realizing the functions of the above embodiments.

Further, the present invention also encompasses arrangements wherein the program code read from the recording medium is written to memory provided in function expansion boards in the computer or function expansion units connected to the computer, following which a CPU or the like provided to the function expansion board or function expanding unit performs all or part of the actual processing based on instructions of the program code, so as to realize the functions of the above embodiments thereby.

In the event of applying the present invention to the above recording medium, program code corresponding to the above-described flowcharts (shown in FIGS. 5 though 7, 13 through 19, and 20 through 22) are stored therein.

The present invention allows a managing site to centrally manage both PC/server equipment and device equipment in an office. Particularly, in the event that an error occurs with equipment to be serviced in the office and a customer in the office notifies the maintenance service company by telephone (i.e., a center call), this enables the maintenance company to accurately deal with the error, and dispatch maintenance (either dispatching service personnel or commissioning the maintenance to another service company) in a smooth manner.

Particularly, this enables a trouble report to be created in the event that the contents of the error can be known, so that the service personnel heading to the site can perform the maintenance work in a speedy manner based on the trouble report, and further, in the event that the contents of the error cannot be known initially, the service personnel is immediately dispatched to the customer site, thereby allowing the service personnel to speedily handle the error.

Also, judging whether or not the error requires external help enables service personnel in the maintenance company to be automatically dispatched in the event that the error does not require external help, and in the event that the error does require external help, the maintenance work is automatically commissioned to the cooperating company.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing apparatus which is connected to a first local managing apparatus which diagnoses an apparatus having a first-type function and a second local managing apparatus which diagnoses an apparatus having a second-type function that is different from the first-type function, comprising: judging means which judge, based on information selected by a user, whether a trouble which has occurred in a predetermined apparatus that has been reported to said information processing apparatus is a trouble related to the apparatus having the first-type function or a trouble related to the apparatus having the second-type function;

determination means which determine that the first local managing apparatus shall diagnose the predetermined apparatus if the trouble which has occurred in the predetermined apparatus is judged to be a trouble related to the apparatus having the first-type function, and determine that the second local managing apparatus shall diagnose the predetermined apparatus if the trouble which has occurred in the predetermined apparatus is judged to be a trouble related to the apparatus having the second-type function, based on the judgment provided by said judging means, and said determining means determining that the first and second local managing apparatuses shall both diagnose the predetermined apparatus if said judging means cannot judge as to whether the trouble which has occurred in the predetermined apparatus is a trouble related to the apparatus having the first-type function or to the apparatus having the second-type function;

diagnosis control means which causes one of the first local managing apparatus and the second local managing apparatus, or both the first and second local managing apparatuses, to preform diagnosis, based on a determination provided by said determination means; and wherein the apparatus of the first type is a peripheral device, and the apparatus of the second type is a computer device.

2. An information processing apparatus according to claim 1, wherein said diagnosis control means issues a diagnosis request to one of the first local managing apparatus and the second local managing apparatus, or both the first and second local managing apparatuses.

3. An information processing apparatus according to claim 1, further comprising display control means for displaying a list of apparatuses connected to the local network on a display unit.

4. An information processing apparatus according to claim 1, further comprising first notifying means for notifying a service person to go and perform a recovery operation in the event that trouble is not determined by the first local managing apparatus or the second local managing apparatus.

5. An information processing apparatus according to claim 4, wherein said first notifying means transmits information to a portable terminal carried by the service person regarding a location to which to go to perform the recovery operation.

6. An information processing apparatus according to claim 1, further comprising report generating means for generating report information indicating contents of the trouble in a case where the trouble is determined by the first local managing apparatus or the second local managing apparatus.

7. An information processing apparatus according to claim 1, further comprising notifying means for sending a notification of a need for a commissioning recovery operation to another company, in a case where the trouble cannot be recovered from without external help.

8. An information processing apparatus according to claim 1, wherein the apparatus of the first type is at least one of a printer, a photocopier, or a scanner.

9. An information processing apparatus according to claim 1, wherein the apparatus of the second type is at least one of a personal computer, a server computer, or a network device.

10. A managing program which is executed on an information processing apparatus which is connected to a first local managing apparatus which diagnoses equipment having a first-type function and a second local managing apparatus which diagnoses equipment having a second-type function that is different from the first-type function, said program causing a computer to execute the following steps:

a judging step, for judging, based on information selected by a user, whether a trouble which has occurred in a predetermined apparatus that has been reported to the information processing apparatus is a trouble related to the apparatus having the first-type function or a trouble related to the apparatus having the second-type function;

a determination step, for determining as to that the first local managing apparatus shall diagnose the predetermined apparatus if the trouble which has occurred in the predetermined apparatus is judged to be a trouble related to the apparatus having the first-type function, and for determining that the second local managing apparatus shall diagnose the predetermined apparatus if the trouble which has occurred in the predetermined apparatus is judged to be a trouble related to the apparatus having the second-type function, based on a judgment provided in said judging step, and for determining that the first and second local managing apparatuses shall both diagnose the predetermined apparatus if in said judging step it is not possible to judge as to whether the trouble which has occurred in the predetermined apparatus is a trouble related to the apparatus having the first-type function or to the apparatus having the second-type function;

a diagnosis control step, execution of which causes one or the other of the first local managing apparatus and the second local managing apparatus, or both the first and second local managing apparatuses, to perform diagnosis, based on a determination obtained in said determination step; and wherein the equipment of the first type is a peripheral device, and the equipment of the second type is a computer device.

11. An equipment managing program according to claim 10, wherein a diagnosis request is issued to one or the other of the first local managing apparatus and the second local managing apparatus, or both the first and second local managing apparatuses, in said diagnosis control step.

12. An equipment managing program according to claim 10, which further causes a computer to execute a display control step for displaying a list of equipment connected to the local network on a display unit.

13. An equipment managing program according to claim 10, which further causes a computer to execute a first notifying step, of notifying a service person to go and perform a recovery operation in a case where trouble is not determined by the first local managing apparatus or the second local managing apparatus.

14. An equipment managing program according to claim 13, wherein information is transmitted to a portable terminal carried by the service person regarding a location for which the service person is to go to perform the recovery operation, in said first notifying step.

15. An equipment managing program according to claim 10, which further causes a computer to execute a report generating step, of generating report information indicating the contents of the trouble in a case where trouble is determined by the first local managing apparatus or the second local managing apparatus.

16. An equipment managing program according to claim 10, which further causes a computer to execute a notifying step, of sending a notification of a need for a commissioning recovery operation to another company, in a case where the trouble cannot be recovered from without external help.

17. An equipment managing program according to claim 10, wherein the equipment of the first type is at least one of a printer, a photocopier, or a scanner.

18. An equipment managing program according to claim 10, wherein the equipment of the second type is at least one of a personal computer, a server computer, or a network device.

19. A computer-readable recording medium storing an equipment managing program which is executed on an information processing apparatus which is connected to a first local managing apparatus which diagnoses equipment having a first-type function and a second local managing apparatus which diagnoses equipment having a second-type function that is different from the first-type function, said equipment managing program causing a computer to execute the following steps: a judging step, for judging, based on information selected by a user, whether a trouble which has occurred in a predetermined apparatus that has been reported to the information processing apparatus is a trouble related to the apparatus having the first-type function or a trouble related to the apparatus having the second-type function;

a determination step, for determining as to that the first local managing apparatus shall diagnose the predetermined apparatus if the trouble which has occurred in the predetermined apparatus is judged to be a trouble related to the apparatus having the first-type function, and for determining that the second local managing apparatus shall diagnose the predetermined apparatus if the trouble which has occurred in the predetermined apparatus is judged to be a trouble related to the apparatus having the second-type function, based on a judgment provided in said judging step, and for determining that the first and second local managing apparatuses shall both diagnose the predetermined apparatus if in said judging step it is not possible to judge as to whether the trouble which has occurred in the predetermined apparatus is a trouble related to the apparatus having the first-type function or to the apparatus having the second-type function;

a diagnosis control step, execution of which causes one or the other of the first local managing apparatus and the second local managing apparatus, or both the first and second local managing apparatuses, to perform diagnosis, based on a determination obtained in said determination step; and wherein the equipment of the first type is a peripheral device, and the equipment of the second type is a computer device.

20. A recording medium according to claim 19, wherein a diagnosis request is issued to one or the other of the first local managing apparatus and the second local managing apparatus, or the first and second local managing apparatuses, in said diagnosis control step.

21. A recording medium according to claim 19, wherein said equipment managing program further causes a computer to execute a display control step, of displaying a list of equipment connected to the local network on a display unit.

22. A recording medium according to claim 19, wherein said equipment managing program further causes a computer to execute a first notifying step, of notifying a service person to go and perform a recovery operation in a case where trouble is not determined by the first local managing apparatus or the second local managing apparatus.

23. A recording medium according to claim 22, wherein information is transmitted to a portable terminal carried by the service person regarding a location for which the service person is to go to perform the recovery operation, in said first notifying step.

24. A recording medium according to claim 19, wherein said equipment managing program further causes a computer to execute a report generating step, of generating report information indicating contents of the trouble in a case where trouble is determined by the first local managing apparatus or the second local managing apparatus.

25. A recording medium according to claim 19, wherein said equipment managing program further causes a computer to execute a notifying step, of sending a notification of a need for a commissioning recovery operation to another company, in a case where the trouble cannot be recovered from without external help.

26. A recording medium according to claim 19, wherein the equipment of the first type is at least one of a printer, a photocopier, or a scanner.

27. A recording medium according to claim 19, wherein the equipment of the second type is at least one of a personal computer, a server computer, or a network device.

28. An equipment managing method which is executed on a system configured of a first local managing apparatus which is connected to a first local managing apparatus which diagnoses equipment having a first-type function and a second local managing apparatus which diagnoses equipment having a second-type function that is different from the first-type function, said method comprising: a judging step, for judging, based on information selected by a user, whether a trouble which has occurred in a predetermined apparatus that has been reported to the information processing apparatus is a trouble related to the apparatus having the first-type function or a trouble related to the apparatus having the second-type function;

a determination step, for determining as to that the first local managing apparatus shall diagnose the predetermined apparatus if the trouble which has occurred in the predetermined apparatus is judged to be a trouble related to the apparatus having the first-type function, and for determining that the second local managing apparatus shall diagnose the predetermined apparatus if the trouble which has occurred in the predetermined apparatus is judged to be a trouble related to the apparatus having the second-type function, based on a judgment provided in said judging step, and for determining that the first and second local managing apparatuses shall both diagnose the predetermined apparatus if in said judging step it is not possible to judge as to whether the trouble which has occurred in the predetermined apparatus is a trouble related to the apparatus having the first-type function or to the apparatus having the second-type function;

a diagnosis control step, execution of which causes one or the other of the first local managing apparatus and the second local managing apparatus, or both the first and second local managing apparatuses, to perform diagnosis, based on a determination obtained in said determination step; and wherein the equipment of the first type is a peripheral device, and the equipment of the second type is a computer device.

29. An equipment managing method according to claim 28, wherein a diagnosis request is issued to one or the other of the first local managing apparatus and the second local managing apparatus, or both the first and second local managing apparatuses, in said diagnosis control step.

30. An equipment managing method according to claim 28, further comprising a display control step, of displaying a list of equipment connected to the local network on a display unit.

31. An equipment managing method according to claim 28, further comprising a first notifying step, of notifying a service person to go and perform a recovery operation in a case where trouble is not determined by the first local managing apparatus or the second local managing apparatus.

32. An equipment managing method according to claim 31, wherein information is transmitted to a portable terminal carried by the service person regarding a location for which the service person is to go to perform the recovery operation, in said first notifying step.

33. An equipment managing method according to claim 28, further comprising a report generating step, of generating report information indicating contents of the trouble in a case where trouble is determined by the first local managing apparatus or the second local managing apparatus.

34. An equipment managing method according to claim 28, further comprising a notifying step, of sending a notification of a need for a commissioning recovery operation to another company, in a case where the trouble cannot be recovered from without external help.

35. An equipment managing method according to claim 28, wherein the equipment of the first type is at least one of a printer, a photocopier, or a scanner.

36. An equipment managing method according to claim 28, wherein the equipment of the second type is at least one of a personal computer, a server computer, or a network device.

* * * * *